(12) United States Patent
Malouin et al.

(10) Patent No.: US 9,967,036 B2
(45) Date of Patent: May 8, 2018

(54) PROCESSING DATA IN A COHERENT OPTICAL COMMUNICATION SYSTEM

(71) Applicant: Juniper Networks, Inc., Sunnyvale, CA (US)

(72) Inventors: Christian Malouin, San Jose, CA (US); Theodore John Schmidt, Gilroy, CA (US); Bo Zhang, San Jose, CA (US); Elias Simpson, San Jose, CA (US); Roberto Marcoccia, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 115 days.

(21) Appl. No.: 14/699,093

(22) Filed: Apr. 29, 2015

(65) Prior Publication Data

US 2015/0236795 A1 Aug. 20, 2015

Related U.S. Application Data

(63) Continuation of application No. 13/434,213, filed on Mar. 29, 2012, now Pat. No. 9,025,963.

(51) Int. Cl.
*H04B 10/61* (2013.01)
*H04L 7/00* (2006.01)
*H04B 10/40* (2013.01)
*H04J 14/06* (2006.01)
*H04L 27/227* (2006.01)

(52) U.S. Cl.
CPC ......... *H04B 10/6161* (2013.01); *H04B 10/40* (2013.01); *H04J 14/06* (2013.01); *H04L 7/0075* (2013.01); *H04L 27/2273* (2013.01)

(58) Field of Classification Search
CPC .................................................. H04B 10/616
See application file for complete search history.

(56) References Cited

U.S. PATENT DOCUMENTS 7,701,842 B2 4/2010 Roberts et al.
8,023,402 B2 9/2011 Roberts et al.
(Continued)

FOREIGN PATENT DOCUMENTS

CN 101247177 A 8/2008
CN 101296042 A 10/2008
CN 101369851 A 2/2009

OTHER PUBLICATIONS

Gardner, "A BPSK/QPSK Timing-Error Detector for Sampled Receivers," IEEE Transactions on Communications, vol. Com-34, No. 5, May 1986, pp. 423-429
Gardner, "Interpolation in Digital Modems—Part I: Fundamentals," IEEE Transactions on Communications, vol. 41, No. 3, Mar. 1993, pp. 501-507.
Malouin et al. "Sub-Rate Sampling in 100 Gb/s Coherent Optical Receivers", OthT3.pdf, OSA/OFC/NFOEC 2010, IEEE, Mar. 2010, 3 pgs.
(Continued)

*Primary Examiner* — Nathan Cors
(74) *Attorney, Agent, or Firm* — Shumaker & Sieffert, P.A.

(57) ABSTRACT

This disclosure describes techniques to sample electrical data streams in coherent receivers. For instance, an analog-to-digital converter (ADC) samples the received electrical data stream at a sampling rate that is nominally twice or greater than twice the symbol rate of the electrical data stream that the ADC receives. A digital filter receives the digital data stream from the ADC, and digitally filters the digital data streams to output a filtered digital electrical data stream at an effective sampling rate that is less than the sampling rate and less than twice the symbol rate, and greater than or equal to the symbol rate.

19 Claims, 8 Drawing Sheets

(56) References Cited

U.S. PATENT DOCUMENTS

| | | | |
|---|---|---|---|
| 2007/0092260 A1* | 4/2007 | Bontu et al. | 398/152 |
| 2008/0198051 A1 | 8/2008 | Tanimura et al. | |
| 2009/0232510 A1 | 9/2009 | Gupta et al. | |
| 2010/0296819 A1 | 11/2010 | Kahn et al. | |
| 2011/0229127 A1 | 9/2011 | Sakamoto et al. | |
| 2011/0236025 A1 | 9/2011 | Wagner et al. | |
| 2012/0082457 A1* | 4/2012 | Yang et al. | 398/65 |
| 2012/0134684 A1* | 5/2012 | Koizumi et al. | 398/202 |
| 2013/0259490 A1 | 10/2013 | Malouin et al. | |

OTHER PUBLICATIONS

Extended European Search Report dated Jul. 24, 2013 in corresponding EP Application No. 13161261.6, 5 pgs.
Response to Invitation dated Apr. 22, 2014, from counterpart European Application No. 13161261.6, filed Jun. 16, 2014, 16 pp.
Office Action, and translation thereof, from counterpart Chinese Application No. 2013101090710, dated May 5, 2015, 18 pp.
Office Action, and translation thereof, from counterpart Chinese Application No. 2013101090710, dated Dec. 21, 2015, 6 pp.
Office Action, and translation thereof, from counterpart Chinese Patent Application No. 2013101090710, dated Jun. 3, 2016, 7 pp.
Extended European Search Report from counterpart European Application No. 16189258.3, dated Jan. 26, 2017, 7 pp.
Response to Extended Search Report dated Jan. 26, 2017, from counterpart European Application No. 16189258.3, filed Aug. 31, 2017, 14 pp.

* cited by examiner

PROCESSING DATA IN A COHERENT OPTICAL COMMUNICATION SYSTEM

This application is a continuation of U.S. patent application Ser. No. 13/434,213, filed Mar. 29, 2012, the entire content of which is incorporated herein by reference.

TECHNICAL FIELD

This disclosure relates to optical communication, and more particularly, to coherent optical communication system.

BACKGROUND

Conventionally, optical communication systems operate in the 1 gigabit per second (Gbps) to 10 Gbps range. With the increase in the amount of data that needs to be communicated, optical communication systems that operate at even higher data rates are needed. For instance, some recent optical communication systems operate in the 100 Gbps range. Scaling to these types of high frequency optical communication systems present design challenges for maintaining signal integrity not only due to the higher bandwidth, but also due to the complex modulation formats.

SUMMARY

In general, this disclosure describes techniques for sampling data streams in coherent receivers. For example, a coherent receiver, in an optical communication system, may include a plurality of analog-to-digital converters (ADCs). Each one of these ADCs receives an analog data stream, and converts the analog data stream into a digital data stream. In the example techniques, the ADCs sample respective analog data streams at a sampling rate that is nominally twice or greater than twice the symbol rate of the analog data streams to generate respective digital data streams.

Each ADC outputs its digital data streams to a respective one of a plurality of digital filters. Each digital filter filters respective digital data streams to output respective filtered digital data streams at an effective sampling rate that is greater than or equal to the symbol rate of the analog data streams and less than twice the symbol rate of the analog data streams and less than the sampling rate. In this way, the techniques mitigate aliasing effects while reducing the rate at which subsequent components need to process data.

In one example, the disclosure describes a method that includes receiving a first analog electrical data stream transmitted by a photonics module in a coherent optical communication system, and a second analog electrical data stream transmitted by the photonics module that together represent a portion of an optical signal received by the photonics module. The method also includes sampling the first analog electrical data stream and the second analog electrical data stream at a sampling rate that is nominally twice or greater than twice a symbol rate of the first and second analog electrical data streams to convert the first analog electrical data stream to a first digital electrical data stream, and convert the second analog electrical data stream to a second digital electrical data stream.

This example method also includes digitally filtering the first digital electrical data stream and the second digital electrical data stream to output a first filtered digital electrical data stream and a second filtered electrical data stream, respectively, at an effective sampling rate that is less than the sampling rate and less than twice the symbol rate of the first and second analog electrical data streams, and greater than or equal to the symbol rate of the first and second analog electrical data streams. The method further includes processing the first and second filtered digital electrical data streams at a rate that is substantially similar to the effective sampling rate to recover data in the optical signal received by the photonics module.

In another example, the disclosure describes a processor that includes a first analog-to-digital converter (ADC) configured to receive a first analog electrical data stream transmitted by a photonics module in a coherent optical communication system, and sample the first analog electrical data stream at a sampling rate that is nominally twice or greater than twice a symbol rate of the first analog electrical data stream and a second analog electrical data stream, which together represent a portion of an optical signal received by the photonics module, to convert the first analog electrical data stream into a first digital electrical data stream. The processor also includes a second ADC configured to receive the second analog electrical data stream transmitted by the photonics module, and sample the second analog electrical data stream at the sampling rate that is nominally twice or greater than twice the symbol rate of the first and second analog electrical data streams to convert the second analog electrical data stream into a second digital electrical data stream.

The example processor also comprises a first digital filter configured to digitally filter the first digital electrical data stream to output a first filtered digital electrical data stream at an effective sampling rate that is less than the sampling rate and less than twice the symbol rate of the first and second analog electrical data streams, and greater than or equal to the symbol rate of the first and second analog electrical data streams. The processor further includes a second digital filter configured to digitally filter the second digital electrical data stream to output a second filtered digital electrical data stream at the effective sampling rate that is less than the sampling rate and less than twice the symbol rate of the first and second analog electrical data streams, and greater than or equal to the symbol rate of the first and second analog electrical data streams. In this example, the processor also includes a downstream hardware unit that includes at least one component configured to process the first and second filtered digital electrical data streams at a rate that is substantially similar to the effective sampling rate to recover data in the optical signal received by the photonics module.

In another example, the disclosure describes a network device that includes a photonics module configured to receive an optical signal in a coherent optical communication system and transmit a first analog electrical data stream and a second analog data stream that together represent a portion of the optical signal. The network device also includes a processor. The processor includes a first analog-to-digital converter (ADC) configured to receive the first analog electrical data stream, and sample the first analog electrical data stream at a sampling rate that is nominally twice or greater than twice a symbol rate of the first and second analog electrical data streams to convert the first analog electrical data stream into a first digital electrical data stream. The processor also includes a second ADC configured to receive the second analog electrical data stream, and sample the second analog electrical data stream at the sampling rate that is nominally twice or greater than twice the symbol rate of the first and second analog electrical data streams to convert the second analog electrical data stream into a second digital electrical data stream.

The processor of this example network device also includes a first digital filter configured to digitally filter the first digital electrical data stream to output a first filtered digital electrical data stream at an effective sampling rate that is less than the sampling rate and less than twice the symbol rate of the first and second analog electrical data streams, and greater than or equal to the symbol rate of the first and second analog electrical data streams. The processor also includes a second digital filter configured to digitally filter the second digital electrical data stream to output a second filtered digital electrical data stream at the effective sampling rate that is less than the sampling rate and less than twice the symbol rate of the first and second analog electrical data streams, and greater than or equal to the symbol rate of the first and second analog electrical data streams. In this example, the processor also includes a downstream hardware unit that includes at least one component configured to process the first and second filtered digital electrical data streams at a rate that is substantially similar to the effective sampling rate to recover data in the optical signal received by the photonics module.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
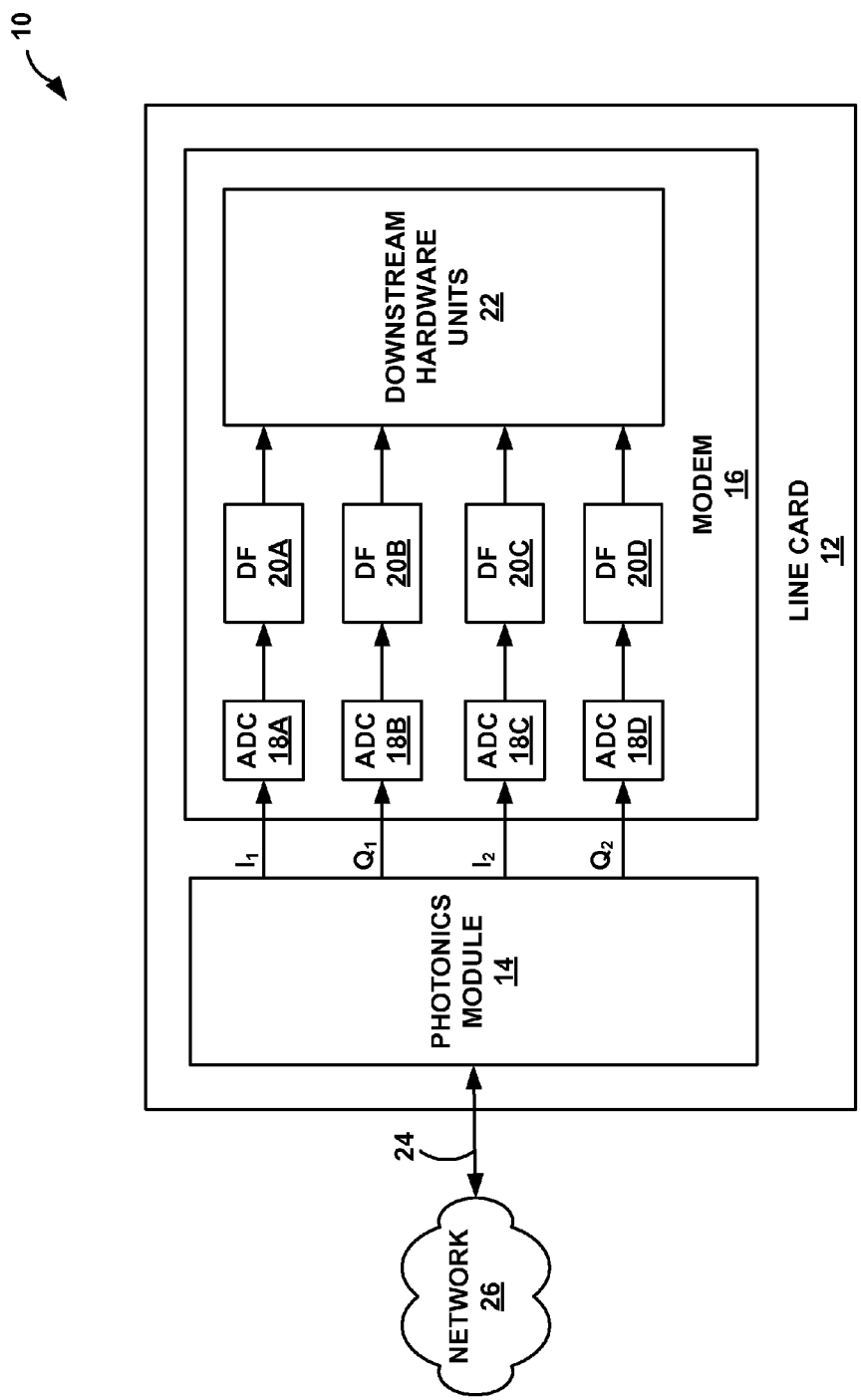
FIG. 1 is a block diagram illustrating an optical communication system in accordance with one or more examples described in this disclosure.

FIG. 1 is a block diagram illustrating an optical communication system 10. As illustrated, optical communication system 10 includes network 26 coupled to line card 12 via optical link 24. Examples of optical communication system 10 include, but are not limited to, wavelength-division multiplexing (WDM) systems, including a dense wavelength division multiplexing (DWDM) system. For example, a WDM system includes a plurality of slots reserved for a plurality of line cards, such as line card 12. However, aspects of this disclosure are not limited to WDM systems that include line cards. The techniques of this disclosure are extendable to other optical communication systems that require transmission and reception of data. For purposes of illustration only and for ease of description, the examples are described in context of a WDM system.

In WDM systems, for downstream transmission, line card 12 receives optical signals from network 26 via optical link 24 that include data for transmission to one or more devices such as switches and routers. In the reverse, for upstream transmission, line card 12 receives data from the switches and routers for transmission to network 26 via optical link 24. Examples of network 26 include, but are not limited to, a wide area network (WAN) or the Internet.

For example, line card 12 includes photonics module 14 and modulator/demodulator (modem) 16. Photonics module 14 includes components that receive a lightwave signal from network 26 via optical link 24, and convert the lightwave signal into one or more electrical data streams. Modem 16 receives the electrical data streams and performs appropriate signal processing such as equalizing optical and electrical impairments, phase tracking, data slicing, and other such signal processing to minimize the number of errors in the data transmitted to the routers and switches from line card 12.

As the amount of data that needs to be transmitted to and received from network 26 increases, the data rate at which line card 12 needs to forward data to and from the routers and switches increases. For example, routers and switches are being designed to receive and transmit data at ever higher data rates, and the WDM systems need scale to the higher data rates to keep pace with data rates from the routers and switches. For instance, it may have been sufficient for line card 12 to operate at approximately 10 gigabits per second (Gbps), but now needs to operate at 100 Gbps, and may be even 126.5 Gbps if forward error correction (FEC) is utilized.

Transmitting and receiving data at such relatively high data rates (e.g., 100 Gbps to 126.5 Gbps) may require modulation schemes with multi-level signaling in order to encode more than 1 bit/symbol, which reduces the symbol rate. For example, without multi-level signaling, one symbol represents one bit, and transmitting and receiving data at 100 Gbps or 126.5 Gbps results in transmitting and receiving data at symbol rate of 100 giga-samples (Gsamples) per second (Gsamples/s) or 126.5 Gsamples/s. However, with multi-level signaling, one symbol represents more than one bit, and the symbol rate can be reduced to less than 100 Gsamples/s or 126.5 Gsamples/s.

For example, transmission and reception of data at such relatively high data rates may require quadrature phase-shift keying (QPSK), as one example, although other modulation schemes are possible such as polarization multiplexed QPSK (PM-QPSK). In QPSK, one symbol represents two bits (e.g., encoding of 2 bits/symbol), and in PM-QPSK, one symbol represents four bits (e.g., encoding of 4 bits/symbol). Accordingly, in PM-QPSK, a symbol rate of 25 giga-baud (Gbaud) can represent 100 Gbps of data (e.g., 100 gigabits*1 symbol/4 bits equals 25 Gbaud), and 31.625 Gbaud can represent 126.5 Gbps of data, where one Gbaud equals one Gsample/s.

For purposes of illustration, the example techniques are described with respect to PM-QPSK modulation. However, aspects of this disclosure should not be considered so limiting. The techniques described in this disclosure are extendable to other modulation schemes such as those used for coherent optical communication systems. For instance, BPSK, PM-BPSK, QPSK, PM-QPSK, M-quadrature amplitude modulation (M-QAM) (where M>4), and PM-M-QAM modulation schemes may each require coherent optical detection, and optical communication system 10 may be considered as a coherent optical communication system.

Coherent optical communication systems refer to optical systems that utilize both magnitude and phase information for transmitting and receiving data such as for phase-shift keying modulation (e.g., BPSK, PM-BPSK, QPSK, PM- QPSK, M-QAM, or PM-M-QAM modulation). For example, in coherent optical communication systems, photonics module 14 may rely on a beating between a received signal and a local reference which maps both magnitude and phase information of the received optical electric field in the optical signal to measurable voltage or current. For instance, coherent optical communication systems may require using a local carrier phase reference generated at photonics module 14 for the reception of optical signals from network 26. For example, as illustrated in more detail with respect to FIG. 5A, photonics module 14 may include optical hybrid mixers to convert the received optical signal into the pairs (e.g., in-phase and quadrature phase) of data streams, referred to as I and Q data streams, for transmission to modem 16.

In PSK modulation, binary ones and zeros are represented by changing, or modulating, the phase of a carrier wave sometimes referred to as a lightwave. In this manner, both the magnitude and the phase of the optical signal are used to transmit data. For example, both the magnitude and the phase information of the received optical signal may be needed to recover the transmitted data (e.g., the binary ones and zeros represented by changing or modulating the phase of a carrier wave).

In some examples, in addition, the modulated lightwave in one polarization may be multiplexed with another modulated polarization, which may be orthogonal to the previous one, to produce a polarization multiplexed (PM) signal, such as PM-QPSK. The polarizations of the lightwave signals may be chosen to be orthogonal to allow for a simple polarization beam splitter or polarizer for polarization demultiplexing when photonics module 14 receives data from network 26.

In this way, PM-QPSK may be considered as a combination of two QPSK lightwave signals, where a first QPSK lightwave signal is for a first polarization of the lightwave, and the second QPSK lightwave signal is for a second polarization of the lightwave. Each of the QPSK lightwave signals utilizes four phases to encode two bits per symbol. Accordingly, PM-QPSK modulation utilizes four phases to encode two bits per symbol per polarization, which results in four bits per symbol.

For example, PM-QPSK modulation requires four input electrical data streams per polarization to impart the complex information on the optical carrier. The electrical signal for each polarization contains a pair of in-phase (I) and quadrature (Q) data streams that represent the complex data waveform. For example, in PM-QPSK modulation, there may be two in-phase data streams and two quadrature data streams, and one in-phase (I) data stream and one quadrature (Q) data stream forms one pair of a complex number, and the other I data stream and the other Q data stream forms another pair of a complex number. Each of the in-phase and quadrature data stream pairs may be nominally orthogonal to one another, in polarization, once the electrical data streams impart their complex information on the optical carrier. Each of these I or Q electrical data streams can be single-ended or differential.

In other words, in PM-QPSK modulation, the input optical signal includes two lightwaves that are polarized orthogonally with respect to one another (e.g., one is horizontally polarized light, and the other is vertically polarized light, as an illustrative example). However, the polarization need not always be horizontal and vertical polarized light, and need not always be orthogonal. For ease of description, one of the lightwaves may be referred to as lightwave with polarization 1, and the other as lightwave with polarization 2. Each of the lightwaves may be associated with a particular magnitude and phase. The magnitude and phase of each of the lightwaves may be represented as a complex signal that includes real and imaginary aspects.

For example, for PM-QPSK modulation, photonics module 14 receives an optical signal via optical link 24 that includes lightwave with polarization 1 and lightwave with polarization 2. Optical components within photonics 12 extract the lightwave with polarization 1 and the lightwave with polarization 2 from the received optical signal. The optical components further mix the lightwave with polarization 1 with a lightwave output from a local oscillator within photonics 12 to generate an in-phase optical data stream, referred to as $I_1$ to indicate that it is for the lightwave with polarization 1, and to generate a quadrature optical data stream, referred to as $Q_1$ to indicate that it is for the lightwave with polarization 1. The $I_1$ data stream is proportional to the real aspect of the complex signal of the lightwave with polarization 1, and the $Q_1$ data stream is proportional to the imaginary aspect of the complex signal of the lightwave with polarization 1.

Similarly, the optical components also mix the lightwave with polarization 2 with a lightwave output from a local oscillator within photonics module 14 to generate an in-phase optical data stream, referred to as $I_2$ to indicate that it is for the lightwave with polarization 2, and to generate a quadrature optical data stream, referred to as $Q_2$ to indicate that it is for the lightwave with polarization 2. Similar to $I_1$ and $Q_1$, the $I_2$ data stream is proportional to the real aspect of the complex signal of the lightwave with polarization 2, and the $Q_2$ data stream is proportional to the imaginary aspect of the complex signal of the lightwave with polarization 2.

In this manner, the pairs of I/Q optical data streams (e.g., a first pair that includes $I_1$ and $Q_1$, and a second pair that includes $I_2$ and $Q_2$) together represent the received optical signal. For example, $I_1$ and $Q_1$ together represent the specific magnitude and phase of the lightwave with polarization 1, and $I_2$ and $Q_2$ together represent the specific magnitude and phase of the lightwave with polarization 2. Also, in this example, the lightwave with polarization 1 and the lightwave with polarization 2 together form the original received optical signal.

Photonics module 14 also includes components such as photo-detectors and transimpedance amplifiers that convert the $I_1$, $Q_1$, $I_2$, and $Q_2$ optical data streams into electrical data streams. For example, FIG. 1 illustrates photonics module 14 transmitting the $I_1$, $Q_1$, $I_2$, and $Q_2$ electrical data streams to modem 16. Modem 16 may be considered as a processor. For instance, examples of modem 16 include, but are not limited to, a digital signal processor (DSP), a general purpose microprocessor, an application specific integrated circuit (ASIC), a field programmable logic array (FPGA), a combination thereof, or other equivalent integrated or discrete logic circuitry.

Modem 16 includes analog-to-digital converters (ADCs) 18A-18D, digital filters (DFs) 20A-20D, and one or more downstream hardware units 22. ADCs 18A-18D receive respective electrical data streams from photonics module 14. For example, ADC 14A receives the $I_1$ electrical data stream, ADC 14B receives the $Q_1$ electrical data stream, ADC 14C receives the $I_2$ electrical data stream, and ADC 14D receives the $Q_2$ electrical data stream. Each of the I/Q electrical data stream pairs are analog signals that ADCs 18A-18D convert to digital signals. Modem 16 is configured to recover the magnitude and phase of the received optical signal. In this manner, modem 16 recovers the data in the optical signal received by photonics module 14.

As described above, PM-QPSK modulation may encode four bits per symbol. Accordingly, with PM-QPSK, 100 Gbps translates to a symbol rate of 25 Gbaud (100 Gbps divided by 4), and 126.5 Gbps translates to a symbol rate of 31.625 Gbaud (126.5 Gbps divided by 4). In this example, the symbol rate of the analog electrical data streams that ADCs 18A-18D receive is 25 Gbaud (i.e., 25 Gsamples/s) or 31.625 Gbaud, if forward error correction (FEC) is used.

To convert the analog electrical data streams into digital data streams, ADCs 18A-18D sample the analog I and Q electrical data streams, and for each sample, assign the sample a value proportional the ADC resolution, which may be referred to as the number of bits of resolution. In the techniques described in this disclosure, ADCs 18A-18D sample the analog I and Q electrical data streams nominally at or beyond the Nyquist rate to minimize aliasing effect. The Nyquist rate is two times the symbol rate of the analog electrical data streams.

The term "nominally" may mean approximately. For example, ADCs 18A-18D may sample analog I and Q electrical data streams at a rate that is slightly less than the Nyquist rate (e.g., slightly less than twice the symbol rate), at the Nyquist rate, or greater than the Nyquist rate. In this disclosure, ADCs 18A-18D sampling analog I and Q electrical data streams at a rate that is slightly less than twice the symbol rate or at the symbol rate may be considered as ADCs 18A-18D sampling analog I and Q electrical data streams at nominally twice the symbol rate.

As one example, ADCs 18A-18D sample the analog I and Q electrical data streams at a sampling rate of 50 gigasamples per second (Gsamples/s) (i.e., 2*25 Gsamples/s) or 63.25 Gsamples/s (i.e., 2*31.625 Gsamples/s) if FEC is used. In this example, the sampling rate is twice the symbol rate. As another example, ADCs 18A-18D may sample the analog I and Q electrical data streams at a sampling rate greater than twice the symbol rate (e.g., 3*25 Gsamples/s or 3*31.625 Gsamples/s, although any value greater than two may be possible). In some cases, ADCs 18A-18D may sample the analog I and Q electrical data streams at a sampling rate that is slightly less than twice the symbol rate (e.g., slightly less than 50 Gsamples/s or 63.25 Gsamples/s).

As one example, the sampling rate that is slightly less than twice the symbol rate may be approximately within 10% of twice the symbol rate. However, the example of approximately within 10% of twice the symbol rate for the sampling rate is provided only for illustration, and is not limiting. The amount by which the sampling rate of ADCs 18A-18D can be reduced to less than the twice the symbol rate may be based on design choice, such as error rate tolerance, and other design choice criteria.

While sampling at nominally the Nyquist rate or greater may minimize aliasing effects, the amount of samples that needs to be processed per second may be relatively large. For example, if the sampling rate of ADCs 18A-18D is 50 Gsamples/s, then the output of each one of ADCs 18A-18D is a digital electrical data stream of 50 Gsamples/s. In some examples, ADCs 18A-18D represent each of the samples with a plurality of bits, which indicates the linear resolution of ADCs 18A-18D. For instance, ADCs 18A-18D may represent each of the samples with 6 bits of linear resolution (i.e., 6 bits represent one sample of the received analog electrical data stream as sampled by ADCs 18A-18D). In this example, if each one of ADCs 18A-18D outputs a digital electrical data stream of 50 Gsamples/s, then each one of ADCs 18A-18D may be considered as outputting 300 Gbps (i.e., 50 Gsamples/s*6 bits/sample equals 300 Gbps).

In general, the techniques described in this disclosure are extendable to any resolution of ADCs 18A-18D, and the 6 bits per sample linear resolution is provided for purposes of illustration only. For purposes of clarity, the techniques described in this disclosure are described in context of the amount of data that modem 16 needs to process per unit of time (e.g., 50 Gsamples/s or 63.25 Gsamples/s) of the digital electrical data streams rather than the bits per second outputted by ADCs 18A-18D, which is a function of the linear resolution. For example, in a first example, the linear resolution of ADCs 18A-18D may be 6 bits, and in a second example, the linear resolution of ADCs 18A-18D may be 4 bits. In both the first and second example, ADCs 18A-18D may sample at a sampling rate of nominally or greater than the Nyquist rate (e.g., 50 Gsamples/s or 63.25 Gsamples/s) to output digital electrical data streams that would need to be processed at 50 Gsamples/s or 63.25 Gsamples/s, in this example. However, in the first example, ADCs 18A-18D each output digital electrical data streams of 300 Gbps or 379.5 Gbps, and in the second example, ADCs 18A-18D each output digital electrical data streams of 200 Gbps or 253 Gbps. Because the number of samples per second in the output of ADCs 18A-18D may be the same independent of the linear resolution, the techniques are described in context of the number of samples per second that need to be processed.

Without digital filters 20A-20D, components of modem 16 that are further downstream from ADCs 18A-18D (e.g., downstream hardware units 22) would need to process 4×50 Gsamples/s or 4×63.25 Gsamples/s (e.g., 50 or 63.25 Gsamples for each one of $I_1$, $Q_1$, $I_2$, and $Q_2$), in this example. In examples where the sampling rate is 50 or 63.25 Gsamples/s, processing such relatively large amount of samples per second may require downstream hardware units 22 of modem 16 to be larger in size and consume more power compared to if there were less samples of data that needed processing.

For example, if ADCs 18A-18D sampled at much less than the Nyquist rate, there would be fewer samples that needed to be processed per second. For instance, if ADCs 18A-18D sampled at 25 Gsamples/s, there would 4×25 Gsamples that would need to be processed per second. However, in this case, aliasing effects would dominate, if the symbol rate of the analog electrical data streams is 25 Gbaud, making it difficult for modem 16 to recover the data encoded in the optical signal received by photonics module 14. Therefore, it may be desirable to sample at nominally the Nyquist rate or higher to mitigate aliasing effects, while at the same time, it may be desirable to minimize the number of samples of data that needs to be processed to reduce the size and power consumption of modem 16. As described in more detail, the example techniques described in disclosure provide for a scheme where the aliasing effects are minimized, and the amount of samples that needs to be processed is minimized.

As illustrated in FIG. 1, digital filters 20A-20D receive respective digital data streams from ADCs 18A-18D. Digital filters 20A-20D may be considered as filtering the digital electrical data streams received from ADCs 18A-18D to output at an effective sampling rate that is less than the sampling rate at which ADCs 18A-18D sampled and less than twice the symbol rate of the analog electrical data streams received by ADCs 18A-18D, and greater than or equal to the symbol rate of the analog electrical data streams received by ADCs 18A-18D. Digital filters 20A-20D outputting filtered digital electrical data streams at the effective sampling rate refers to a rate at which ADCs 18A-18D would have outputted data streams had ADCs 18A-18D sampled at a sampling rate that is substantially similar to the effective sampling rate. However, the filtered digital electrical data streams outputted by digital filters 20A-20D may not suffer from aliasing effects which would have occurred had ADCs 18A-18D sampled at a sampling rate that is substantially similar to the effective sampling rate without an analog filter filtering the electrical data streams, in the analog domain, prior to ADCs 18A-18D receiving respective electrical data streams.

As an example, assume the symbol rate of the analog electrical data streams outputted by photonics module 14 equals R. In this example, ADCs 18A-18D receive analog electrical data streams having a symbol rate of R, and sample the analog electrical data streams at a sampling rate of 2*R, which is represented as Rs (i.e., Rs=2*R). Each one of ADCs 18A-18D output a digital data stream, where each of the digital data streams include at least 2*R samples for processing per second. In some example techniques described in this disclosure, digital filters 20A-20D digitally filter the digital data streams and output filtered digital data streams at an effective sampling rate of less than 2*R, but greater than or equal to R. For example, if the effective sampling rate of the output from digital filters 20A-20D is N, then N is less than 2*R, and greater than or equal to R (i.e., R≤N<2*R).

As another example, assume that the sampling rate is 1.999*R, where R is the symbol rate. The sampling rate of 1.999*R may be considered as nominally twice the symbol rate. In this example, digital filters 20A-20D digitally filter the digital data streams and output filtered digital data streams at an effective sampling rate of less than 1.999*R (e.g., R≤N<1.999*R).

As yet another example, assume that the sampling rate is 3*R, where R is the symbol rate. The sampling rate of 3*R is greater than twice the symbol rate. In this example, digital filters 20A-20D digitally filter the digital data streams and output filtered digital data streams at an effective sampling rate of less than twice the symbol rate, and greater than or equal to the symbol rate (i.e., R≤N<2*R).

In other words, in examples where the sampling rate is equal to twice the symbol rate or slightly less than twice the symbol rate (i.e., where the sampling rate is nominally twice the symbol rate), digital filters 20A-20D digitally filter the digital data streams and output filtered digital data streams at an effective sampling rate that is less than the sampling rate. In examples where the sampling rate is greater than twice the symbol rate, digital filters 20A-20D digitally filter the digital data streams and output filtered digital data streams at an effective sampling rate that is less than twice the symbol rate. Accordingly, to cover examples where the sampling rate is nominally twice the symbol rate, and to cover examples where the sampling rate is greater than twice the symbol rate, this disclosure may describe digital filters 20A-20D as digitally filtering the digital data streams and output filtered digital data streams at an effective sampling rate that is less than the sampling rate (to cover the nominally twice the symbol rate example) and less than twice the symbol rate of the first and second analog electrical data streams (to cover the greater than twice the symbol rate example).

To understand the effective sampling rate, assume that ADCs 18A-18D sampled respective analog electrical data streams at the effective sampling rate N, where N is much less than 2*R and greater than or equal to R. In this example, the digital data stream outputted by each one of 18A-18D would include N samples for processing per second, which would be less than the number of samples that need processing per second if ADCs 18A-18D sampled at 2*R (i.e., processing N samples per second is less than processing 2*R samples per second because N is less than 2*R). However, in this case, because ADCs 18A-18D sampled at much less than 2*R, aliasing effects may dominate making it difficult to recover the data from the received optical signal.

In this disclosure, digital filters 20A-20D may be considered as outputting filtered digital electrical data streams that need to be processed at a rate that is substantially similar to a rate at which the data streams would need to be processed had ADCs 18A-18D sampled at the effective sampling rate. However, the filtered digital electrical data streams outputted by digital filters 20A-20D may suffer minimally from aliasing effects because ADCs 18A-18D sampled at a sampling rate that is nominally 2*R or greater than 2*R, and not at a sampling rate equal to the effective sampling rate N. To allow ADCs 18A-18D to sample at the effective sampling rate, while minimizing aliasing, would have required low pass filtering the analog electrical data streams in the analog domain with anti-aliasing filters prior to ADCs 18A-18D receiving the analog electrical data streams, as is done in some other techniques described below. However, as described in more detail below, filtering in the analog domain with analog anti-aliasing filters may result in poorer performance as compared to filtering in the digital domain with digital filters 20A-20D.

As an illustrative example, assume that the symbol rate R is 25 Gbaud. In this example, ADCs 18A-18D sample the analog electrical data streams at 50 Gsamples/s. Also, assume that digital filters 20A-20D output filtered digital electrical data streams at an effective sampling rate of 31.25 Gsamples/s. In this example, the rate at which the output of digital filters 20A-20D need to be processed is 31.25 Gsamples/s, which is as if ADCs 18A-18D sampled the analog electrical data streams at 31.25 Gsamples/s. However, if ADCs 18A-18D were to have sampled the analog electrical data streams at 31.25 Gsamples/s, then aliasing effects would dominate. With ADCs 18A-18D sampling at the sampling rate of 50 Gsamples/s, and digital filters 20A-20D filtering the digital electrical data streams to output filtered digital electrical data streams at 31.25 Gsamples/s (e.g., the effective sampling rate), the techniques described in this disclosure may reduce the number of samples that need to be processed per second, while minimizing aliasing effects in the data streams.

In some examples, the effective sampling rate N may be approximately 5/4*R; although, aspects of this disclosure are not so limited. In coherent optical communication systems, the data is encoded in the magnitude and/or phase of the optical signal. If the magnitude and/or phase of the optical signal cannot be reliably recovered by downstream hardware units 22 of modem 16, the transmitted data cannot be reliably recovered, thereby causing an increase in the BER. In some examples, outputting filtered digital electrical data streams at approximately 5/4*R may minimize the amount of data that downstream hardware units 22 need to process, while causing only a small BER penalty due to the aliasing effect if appropriate anti-aliasing filters are used.

Digital filters 20A-20D may be considered as anti-aliasing filters, and particularly, anti-aliasing filters that function in the digital domain. For example, as discussed above, digital filters 20A-20D output filtered digital electrical data streams at less than the sampling rate and less than the Nyquist rate (i.e., less than twice the symbol rate). The reduction in the amount of data that needs processing may introduce aliasing effects in the resulting data stream. In examples described in this disclosures, digital filters 20A-20D perform filtering functions that minimize the aliasing effect. Therefore, these filtering functions of digital filters 20A-20D may be considered as performing anti-aliasing functions. As described in more detail, digital filters 20A-20D implement the filtering functions digitally, rather than in the analog domain. For example, digital filters 20A-20D implement the filtering functions on the digital data stream outputs of ADCs 18A-18D, rather than on the analog data stream inputs of ADCs 18A-18D.

Digital filters 20A-20D may perform decimation like functions, but the effective sampling rate of the digital data streams outputted by digital filters 20A-20D is less than the sampling rate at which ADCs 18A-18D sampled, and less than two times the symbol rate (e.g., less than 2*R), rather than equal to 2*R. Also, the effective sampling rate may be in the Gsamples/s range rather than the kilo or mega samples/s range. For example, decimation is sometimes used to refer to the process of reducing the sampling rate. In techniques described in this disclosure, digital filters 20A-20D receive digital electrical data streams sampled at a sampling rate that is nominally 2*R or greater than 2*R, and output digital electrical data streams with less than 2*R samples per second of data and with less that the number of samples from ADCs 18A-18D sampling at the sampling rate, and therefore may be considered as performing functions analogous to reducing the sampling rate (i.e., decimation).

However, in some other cases, the term decimation is used in context where the sampling rate was greater than 2*R, and decimation is used to reduce the sampling rate to equal 2*R. In the example techniques described in this disclosure, digital filters 20A-20D may output filtered digital electrical data streams at the effective sampling rate that is less than 2*R. Furthermore, in some other cases, the term decimation is used to refer to decimating sampling rates in the kilo or mega samples/s range. However, in the example techniques described in this disclosure, the sampling rate may be in the range of 50 Gsamples/s and 63.25 Gsamples/s. Therefore, the term decimation is used as an illustrative term to assist with understanding, and should not be used as a term to limit the techniques described in this disclosure.

There may be various ways in which digital filters 20A-20D digitally filter the digital electrical data streams to output filtered digital electrical data streams at the effective sampling rate N, where N is less than 2*R and less than the sampling rate, and greater than or equal to R. For purposes of illustration only, the following are a few example techniques that digital filters 20A-20D may implement. These techniques should not be considered limiting, and the techniques described in this disclosure are not limited to any particular technique that digital filters 20A-20D implement for digitally filtering the digital electrical data streams to output filtered digital electrical data streams at the effective sampling rate N.

As one example, each one of digital filters 20A-20D may include a low pass filter and a downsampler. The low pass filter may be implemented as a finite impulse response (FIR) or infinite impulse response (IIR) filter. The bandwidth of the low pass filter may be substantially equal to the desired effective sampling rate. In these examples, the low pass filter may be considered as an anti-aliasing filter that minimizes aliasing effects in the filtered digital electrical data streams outputted by digital filters 20A-20D at the effective sampling rate which is less than the Nyquist rate. The downsampler may remove digital bits from the low pass filtered electrical data stream to achieve the effective sampling rate.

However, the above example technique to achieve the effective sampling rate may only allow achieving effective sampling rate that are integer factors of the symbol rate. To achieve the effective sampling rate that is a fractional factor (e.g., 5/4*R) of the symbol rate, each one of digital filters 20A-20D may include an upsampler, a low pass filter, and a downsampler. The upsampler upsamples the received electrical data stream to increase the amount of data that needs to be processed per second. The low pass filter low pass filters the upsampled electrical data stream, and may be considered as the anti-aliasing filter, and the downsampler removes digital bits from the low pass filtered electrical data stream to achieve the effective sampling rate.

As an illustrative example where digital filters 20A-20D include an upsampler, a low pass filter, and a downsampler, assume that ADCs 18A-18D sample the analog electrical data streams at 2*R, where R is the symbol rate. Therefore, digital filters 20A-20D receive digital data streams sampled at 2*R. Also, assume that the desired effective sampling rate is 5/4*R. In this example, the upsampler of digital filters 20A-20D may upsample the received digital data stream by a factor of 5 so that the number of samples that need to be processed per second is 10*R. The low pass filter (e.g., the FIR or IIR low pass filter) low pass filters the upsampled digital data stream with a bandwidth of 5/4*R/2. The downsampler may then keep every $8^{th}$ digital sample and remove the 7 digital samples that are between every $8^{th}$ digital sample. In this manner, with upsampling, low pass filtering, and downsampling, digital filters 20A-20D output filtered digital electrical data streams with 10*R/8 samples that need to be processed per second, which is mathematically equivalent to achieving the effective sampling rate of 5/4*R.

As another example technique for outputting filtered digital electrical data streams at the effective sampling rate, digital filters 20A-20D may utilize a polynomials interpolation scheme. One example of polynomial interpolation scheme is described in F. M. Gardner, "Interpolation in Digital Modems—Part I: Fundamentals," IEEE Transactions on Communications, vol. 41, No. 3, March 1993, and is incorporated by reference in its entirety.

In this manner, the example techniques described in this disclosure sample the analog electrical data streams outputted by photonics module 14, via ADCs 18A-18D, at a sampling rate that is nominally twice the symbol rate and greater than twice the symbol rate to mitigate aliasing effects. The techniques then digitally filter, with digital filters 20A-20D, the resulting data streams to output filtered data streams at an effective sampling rate that is less than the sampling rate and less than twice the symbol rate, and greater than or equal to the symbol rate to reduce the rate at which subsequent components (e.g., downstream hardware units 22) within modem 16 need to process the filtered data streams. This may reduce the amount of samples that downstream hardware units 22 need to process per second, which in turn may reduce the amount of power that downstream hardware units 22 consume as compared to examples where digital filters 20A-20D do not output data streams at the effective sampling rate. Also, with a reduction in the amount of samples that downstream hardware units 22 need to process per second, the size of downstream hardware units 22 may be reduced compared to examples where digital filters 20A-20D do not output data streams at the effective sampling rate.

In the example techniques described in this disclosure, the frequency of the analog I and Q electrical data streams that ADCs 18A-18D receive may be substantially the same as the frequency of the analog I and Q electrical data streams that photonics module 14 transmits. For example, the analog I and Q electrical data streams may not be low pass filtered with an analog low pass filter prior to ADCs 18A-18D receiving analog I and Q electrical data streams.

For instance, to reduce the number of samples that need to be processed per second, some other techniques utilize anti-aliasing filters in the analog domain to low pass filter the analog electrical data streams received from photonics module 14. Then, ADCs in these other techniques sample the analog low pass filtered electrical data streams at a sampling rate less than the Nyquist rate (e.g., less than 2*R). In this case, the analog low pass filter functions as an anti-aliasing filter in the analog domain and, with proper choice of the low pass bandwidth and filter shape, the aliasing effects attendant in sampling at less than the Nyquist rate can be minimized.

The ADCs in these other techniques may consume less power compared to ADCs 18A-18D because the ADCs in these other techniques sample at a lower sampling rate (e.g., less than 2*R) compared to ADCs 18A-18D that sample at a sampling rate that is nominally 2*R or greater than 2*R. However, it may be disadvantageous to utilize an analog low pass filter as an anti-aliasing filter that operates in the analog domain to low pass filter the analog data streams before the ADCs receive the analog data streams, as is the case in the other techniques, compared to utilizing digital filters 20A-20D to low pass filter the digital data streams outputted by ADCs 18A-18D.

For example, usually the analog filter shape is not as sharp as the filter shape for digital filters 20A-20D, and in instances where the analog filter shape is as sharp as that of digital filters 20A-20D, the phase linearity may be negatively impacted as compared to the phase linearity in digital filters 20A-20D. As another example, the analog filter may be sensitive to manufacturing variability, whereas digital filters 20A-20D function substantially the same for different ones of modem 16. Also, using an analog filter may require residing the analog filter between the photonics module and the ADCs, in the other techniques. The inclusion of the analog filter may increase the complexity of modem 16, which may increase the cost of modem 16.

Furthermore, care may need to be taken to match the impedance of the input of the analog filter and the output of the photonics module, and impedance of the output of the analog filter and the input of the ADCs, in these other techniques, to minimize performance degradation due to reflections. In the techniques described in this disclosure, digital filters 20A-20D may be programmed into modem 16, and therefore may not require inclusion of additional components that increase cost and complexity. Also, since digital filters 20A-20D are not coupled to photonics module 12, but rather to ADCs 18A-18D, there may not be performance degradation due to reflections.

In this manner, utilizing ADCs 18A-18D and digital filters 20A-20D to achieve an effective sampling rate that is less than the sampling rate and less than twice the symbol rate, as described above, may provide for a completely controllable and predictable implementation compared to the more complicated and less controllable analog filtering technique described above. For example, utilizing ADCs 18A-18D and digital filters 20A-20D, as described above, may eliminate the need for the analog anti-aliasing filters used in the other techniques. For instance, by utilizing low complexity digital filters 20A-20D, after ADCs 18A-18D, that can be implemented as part of the digital signal processing (DSP) functions of modem 16, the size of downstream hardware units 22 and the amount of power consumed by downstream hardware units 22 may be reduced, thereby improving performance, manufacturability, and cost of modem 16.

Furthermore, digital filters 20A-20D receive the digital electrical data streams at the sampling rate of the ADCs 18A-18D. For example, the amount of Gsamples/s that ADCs 18A-18D output is the amount of Gsamples/s that digital filters 20A-20D receive. In other words, digital filters 20A-20D receive the digital electrical data streams from ADCs 18A-18D without any further downsampling, mixing, filtering, or modification that modifies the number of samples per second of the data streams that digital filters 18A-18D receive.

In this manner, the digital electrical data streams that digital filters 20A-20D receive together represent the magnitude and phase information of the received optical signal from which the original transmitted data is decoded. For example, ADC 18A and ADC 18B each receive analog electrical data streams (i.e., $I_1$ and $Q_1$) that together represent a portion of the received optical signal (e.g., the real and imaginary parts of the received lightwave with polarization 1). ADC 18C and ADC 18D each receive analog electrical data streams (i.e., $I_2$ and $Q_2$) that together represent a portion of the received optical signal (e.g., the real and imaginary parts of the received lightwave with polarization 2). Each of the ADCs 18A-18D sample the received analog electrical data streams at a sampling rate equal to nominally twice the symbol rate or greater than twice the symbol rate of the electrical data streams. Digital filters 20A-20D each receive the digital electrical data streams and digitally filter the electrical data streams to output filtered electrical data streams at the effective sampling rate.

Digital filters 20A-20D then transmit the filtered digital electrical data streams to downstream hardware units 22. Downstream hardware units 22 process the filtered digital electrical data streams at a rate that is substantially similar to the effective sampling rate to recover data in the optical signal received by photonics module 14. Downstream hardware units 22 are illustrated in greater detail in FIGS. 2 and 3. As described in more detail, in some examples, downstream hardware units 22 may also include another digital filter that further reduces the effective sampling rate. For example, the effective sampling rate of the digital electrical data streams outputted by digital filters 20A-20D may be greater than the symbol rate (R). In some examples, after some further processing, a digital filter within downstream hardware units 22 may further reduce the effective sampling rate to be substantially equal to R.

Figure 2:
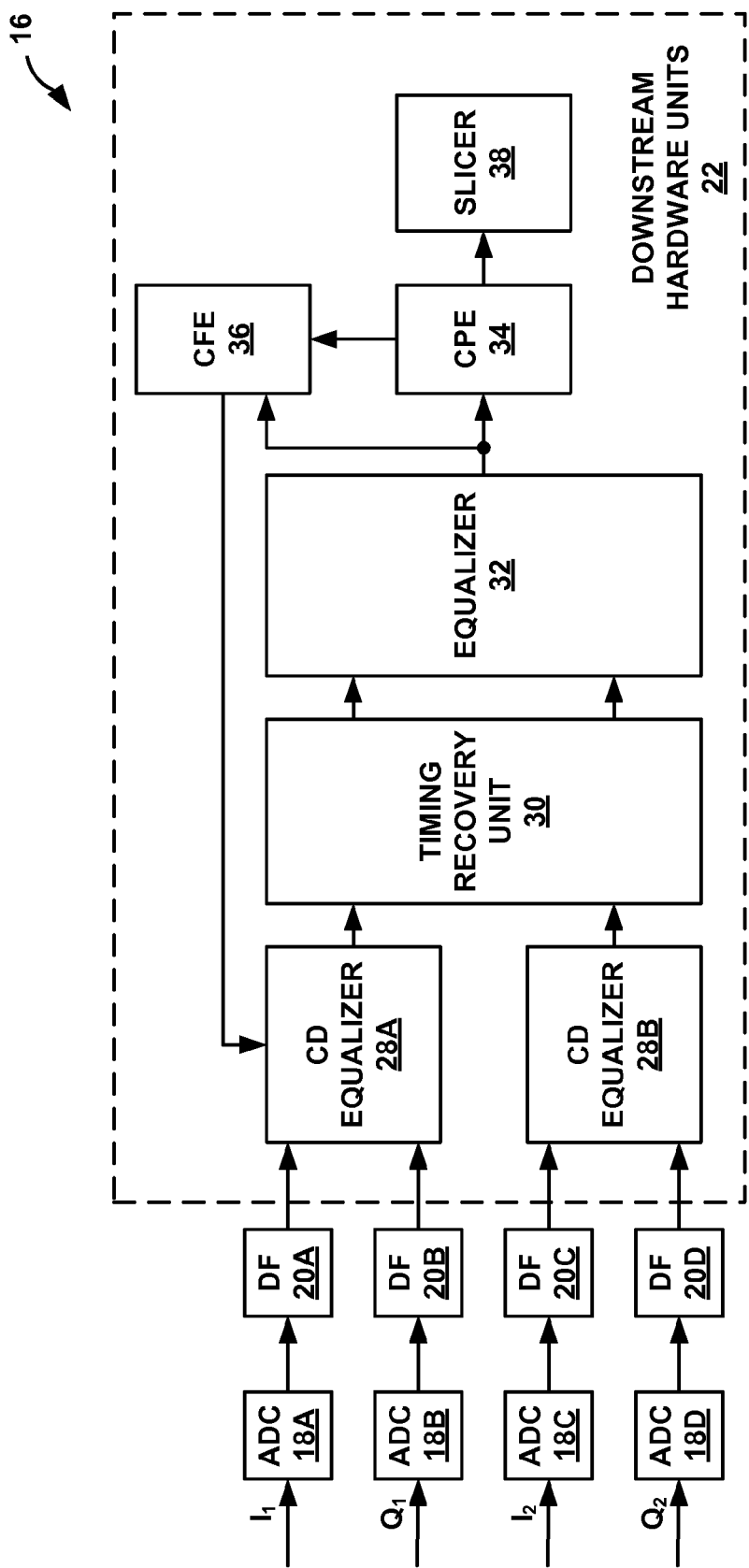
FIG. 2 is a block illustrating an example of downstream hardware units of the modem of FIG. 1 in greater detail.

FIG. 2 is a block that illustrating an example of downstream hardware units of the modem of FIG. 1 in greater detail. For purposes of clarity, FIG. 2 also illustrates ADCs 18A-18D and digital filters (DF) 20A-20D, which are substantially similar to ADCs 18A-18D and digitals filters 20A-20D of FIG. 1, and are not discussed further with respect to FIG. 2. Examples of downstream hardware units 22 include chromatic dispersion (CD) equalizers 28A and 28B, timing recovery unit 30, equalizer 32, carrier phase estimation (CPE) unit 34, carrier frequency estimation (CFE) unit 36, and slicer 38. The output of slicer 38 may be a relatively high data rate electrical data stream. Components such as a training deframer may receive the output of slicer 38. A forward-error correction (FEC) decoder, if FEC is utilized, may receive the output of the training deframer and may decode the electrical data stream for further transmission downstream (e.g., to the one or more switches and routers after deserialization). The training deframer and FEC decoder may be part of modem 16, or external to modem 16 and are not illustrated for purposes of clarity.

As illustrated, CD equalizer 28A receives one pair of the I/Q digitized data streams (i.e., $I_1$ and $Q_1$ data streams outputted by digital filters 20A and 20B), and CD equalizer 28B receives another pair of the I/Q data streams (i.e., $I_2$ and $Q_2$ data streams outputted by digital filters 20C and 20D). CD equalizer 28A and CD equalizer 28B implement a complex filter on received digital electrical data streams to compensate for optical distortion that is represented electrically on the digital electrical data streams outputted by digital filters 20A-20D.

For example, CD equalizer 28A and CD equalizer 28B compensate for chromatic dispersion of optical link 24. For instance, if photonics module 14 receives an optical signal in a long haul application (e.g., from a transmitter that is many miles away), the digital electrical data streams outputted by digital filters 20A-20D may suffer from chromatic dispersion. This chromatic dispersion is an example of optical distortion that is part of the received optical signal, which CD equalizer 28A and CD equalizer 28B compensate for.

As one example, the chromatic dispersion may cause inter-symbol-interference (ISI). In this case, because of the ISI, the $I_1$, $Q_1$, $I_2$, and $Q_2$ digital electrical data streams outputted by digital filters 20A-20D may not be identical to the $I_1$, $Q_1$, $I_2$, and $Q_2$ digital electrical data streams that are used to generate the transmitted optical signal that photonics module 14 receives. To compensate for the chromatic dispersion, CD equalizer 28A and CD equalizer 28B may be finite impulse response (FIR) filters.

The number of taps for the FIR filters of CD equalizer 28A and CD equalizer 28B may be proportional to the effective sampling rate of the digital electrical data streams outputted by digital filters 20A-20D (e.g., proportional to the number of samples that need to be processed per second). Accordingly, reducing the number of samples that need to be processed per second with digital filters 20A-20D allows for a reduction in the number of taps for the FIR filters of CD equalizer 28A and CD equalizer 28B, while achieving the same amount of chromatic dispersion compensation. Reducing the number of taps for the FIR filters of CD equalizer 28A and CD equalizer 28B reduces the size and the amount of power consumed. For example, CD equalizer 28A and CD equalizer 28B may potentially be the largest components of modem 16, and may also consume the most amount of power. By reducing the number of samples that need to be processed per second rate with digital filters 20A-20D, the size of CD equalizer 28A and CD equalizer 28B and the amount of power consumed by CD equalizer 28A and CD equalizer 28B may be reduced.

In some alternate examples, it may be possible to configure CD equalizer 28A and CD equalizer 28B to include the same number of taps for the FIR filters as for instances where the number of samples that need to be processed per second is not reduced. Even in these alternate examples, it may be beneficial to include digital filters 20A-20D to reduce the number of samples that need to be processed per second. For instance, in these alternate examples, it may be possible to achieve better chromatic dispersion compensation by reducing the number of samples that need to be processed per second with digital filters 20A-20D and compensating for the chromatic dispersion using CD equalizer 28A and CD equalizer 28B that include the same number of taps for the FIR filters as examples where the number of samples that need to be processed per second is not reduced.

Timing recovery unit 30 receives data streams from CD equalizer 28A and CD equalizer 28B and performs timing recovery. For example, timing recovery unit 30 performs symbol timing utilizing interpolation and Timing Error Detector (TED) to achieve symbol timing recovery, although other timing recovery techniques are possible. One example of the timing recovery technique is described in F. M. Gardner, "BPSK/QPSK Timing-Error Detector for Sampled Receivers," IEEE Transactions on Communications, vol. COM-34, No. 5, May 1986, and is incorporated by reference in its entirety.

The sampling frequency locked clock, generated by timing recovery unit 30, may provide the clock signal for components of modem 16 or for other components on line card 12. In some examples, timing recovery unit 30 may upsample the digital electrical data streams received from CD equalizer 28A and CD equalizer 28B so that the number of samples that need to be processed per second of the digital electrical data streams is greater than the effective sampling rate; however, such upsampling is not be required in every example.

Equalizer 32 receives the data streams from timing recovery unit 30 and performs any other compensations. For example, CD equalizer 28A and CD equalizer 28B may not be able to compensate for all of the chromatic dispersion, and equalizer 32 may compensate for any remaining chromatic dispersion. In addition, equalizer 32 may un-mix the polarization of the received data streams. For example, equalizer 32 may compensate for any polarization mixing in optical link 24 (e.g., mixing between the lightwave with polarization 1 and the lightwave with polarization 2).

Carrier phase estimation unit (CPE) 34 and carrier frequency estimation unit (CFE) 36 fix the phase and the frequency offset (between the signal and the local oscillator) of the data stream. For example, photonics module 14 may include a free-running local oscillator used to recover the optical $I_1$, $Q_1$, $I_2$, and $Q_2$ data streams. Because the local oscillator may be a free-running oscillator, the $I_1$ and $Q_1$ data streams may be orthogonal to one another, and the $I_2$ and $Q_2$ data streams may be orthogonal to one another; however, the phases of each of these data streams may not be fixed. CPE 34 and CFE 36 function in feedback to estimate the relative frequency and phase between the received signal and the local oscillator to track the phase of the data streams. Slicer 38 receives the data streams from CPE 34 and digitizes to binary sequences the data streams for further transmission to other components within modem 16 or other components on line card 12.

Figure 3:
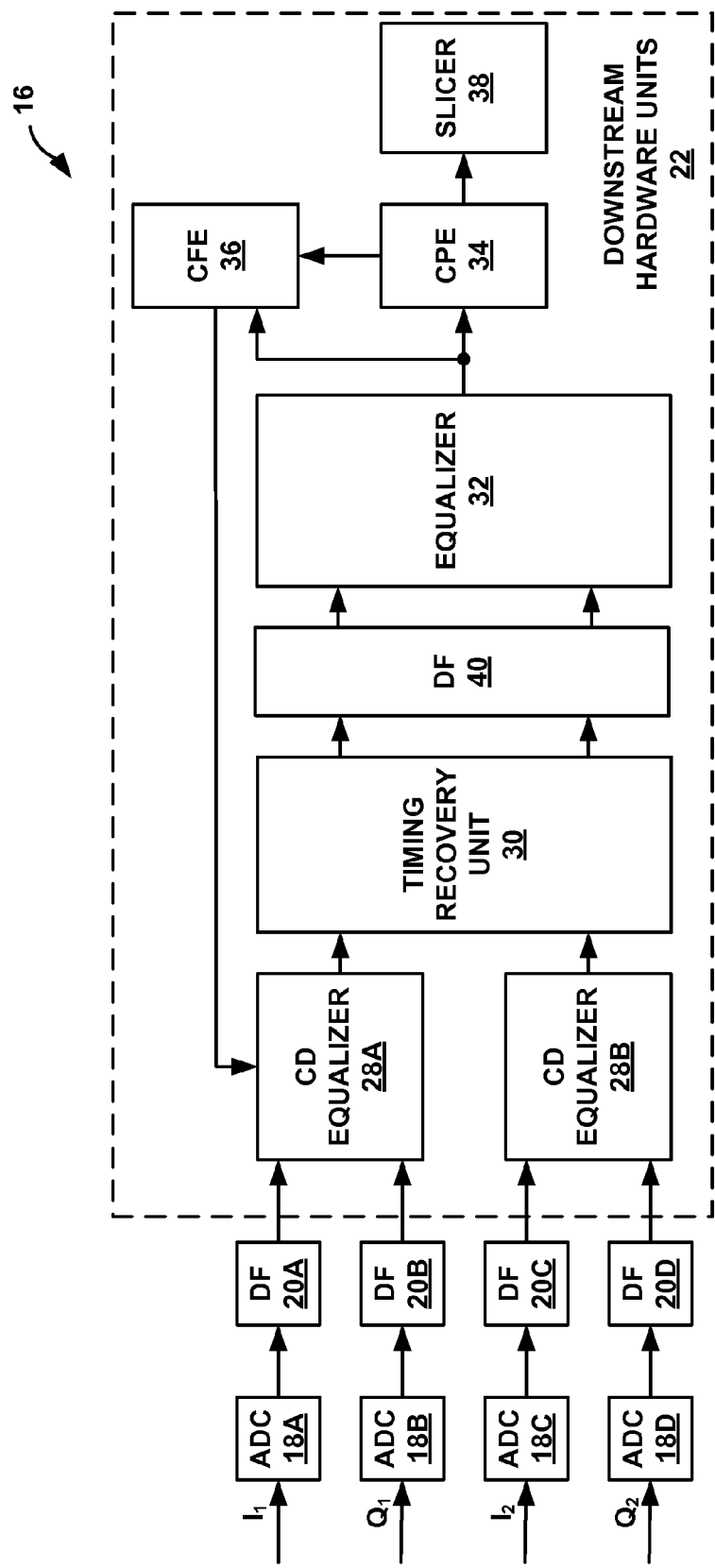
FIG. 3 is a block illustrating another example of downstream hardware units of the modem of FIG. 1 in greater detail.

FIG. 3 is a block illustrating another example of downstream hardware units of the modem of FIG. 1 in greater detail. Similar to FIG. 2, downstream hardware units 22, in FIG. 3, include CD equalizer 28A, CD equalizer 28B, timing recover unit 30, equalizer 32, CPE 34, CFE 36, and slicer 38. These units are substantially similar to the corresponding units illustrated in FIG. 2, and are not discussed further with respect to FIG. 3.

As illustrated in FIG. 3, downstream hardware units 22 also includes digital filter 40, which is coupled to timing recover unit 30 and equalizer 32. Digital filter 40 may be similar to digital filters 20A-20D. However, digital filter 40 receives digital electrical data streams at the effective sampling rate, as reduced by digital filters 20A-20D, and further reduces the effective sampling rate to a rate that is greater than or equal to the symbol rate. For example, similar to above, assume the symbol rate of the analog electrical data streams that ADCs 18A-18D receive is R, and ADCs 18A-18D sample the received analog electrical data streams at 2*R. In this example, digital filters 20A-20D may achieve an effective sampling rate 5/4*R for the outputted digital data streams. Digital filter 40 may further filter the data stream and output a data stream with a further reduced effective sampling rate of R, or a rate greater than R and less than 5/4*R.

In the example illustrated in FIG. 3, it may be possible to further reduce the number of samples that need to be processed per second from the output of timing recover unit 30, while leaving sufficient samples to properly recover the magnitude and phase information of the received optical signal to decode the transmitted data. In this manner, the number of samples that need to be processed per second by equalizer 32, CPE 34, CFE 36, and slicer 38 may be further reduced with digital filter 40, which promotes further reduction in the size of equalizer 32, CPE 34, CFE 36, and slicer 38, and the amount of power consumed by equalizer 32, CPE 34, CFE 36, and slicer 38.

Figure 4:
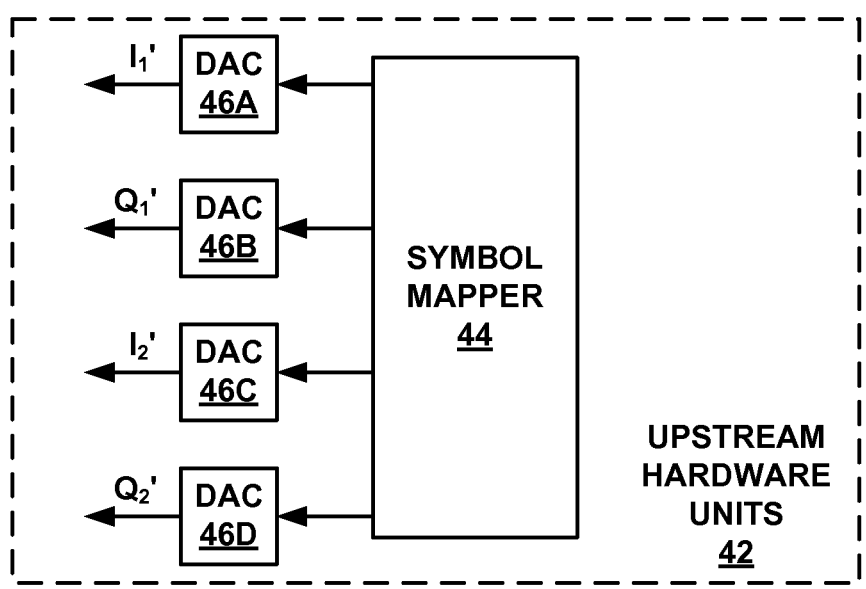
FIG. 4 is a block diagram illustrating an example of upstream hardware units of the modem of FIG. 1 in greater detail.

FIG. 4 is a block diagram illustrating an example of upstream hardware units of the modem of FIG. 1 in greater detail. As described above, modem 16 receives downstream data from network 26 that modem 16 forwards to routers and switches. In the reverse, modem 16 receives upstream data from the routers and switches that modem 16 transmits to network 26. FIG. 4 illustrates examples of upstream hardware units 42 of modem 16 that transmit received data to photonics module 14 for transmission to network 26 via optical link 24.

Upstream hardware units 42 include symbol mapper 44 and digital to analog converters (DACs) 46A-46B. Symbol mapper 44 may receive a forward-error coded (FEC) encoded data stream that has been framed by a training framer. The training framer may be part of modem 16 or external to modem 16. Symbol mapper 44 may map the received encoded data stream to the symbols for the desired modulation. For example, symbol mapper 44 may map the encoded data stream to the symbols for PM-QPSK modulation to generate the pairs of I' and Q' data streams. The I' and Q' data streams is used to distinguish the pairs of data streams that modem 16 transmits and pairs of data streams that modem 16 receives. For example, the I' and Q' data streams refer to data streams that modem 16 transmits and the I and Q data streams refer to data stream that modem 16 receives.

DACs 46A-46D receive digital pairs of I' and Q' data streams from symbol mapper 44 and convert the digital data streams into analog data streams for transmission to pluggable photonics module 14. For example, DACs 46A-46D are output units of modem 16 that transmit data streams $I_1'$, $Q_1'$, $I_2'$, and $Q_2'$ to photonics module 14. Photonics module 14 uses the received data streams from DACs 46A-46D to generate a lightwave with polarization 1 and a lightwave with polarization 2. Photonics module 14 then combines these two lightwaves and transmits a single optical signal to network 26 via optical link 24.

Figure 5A:
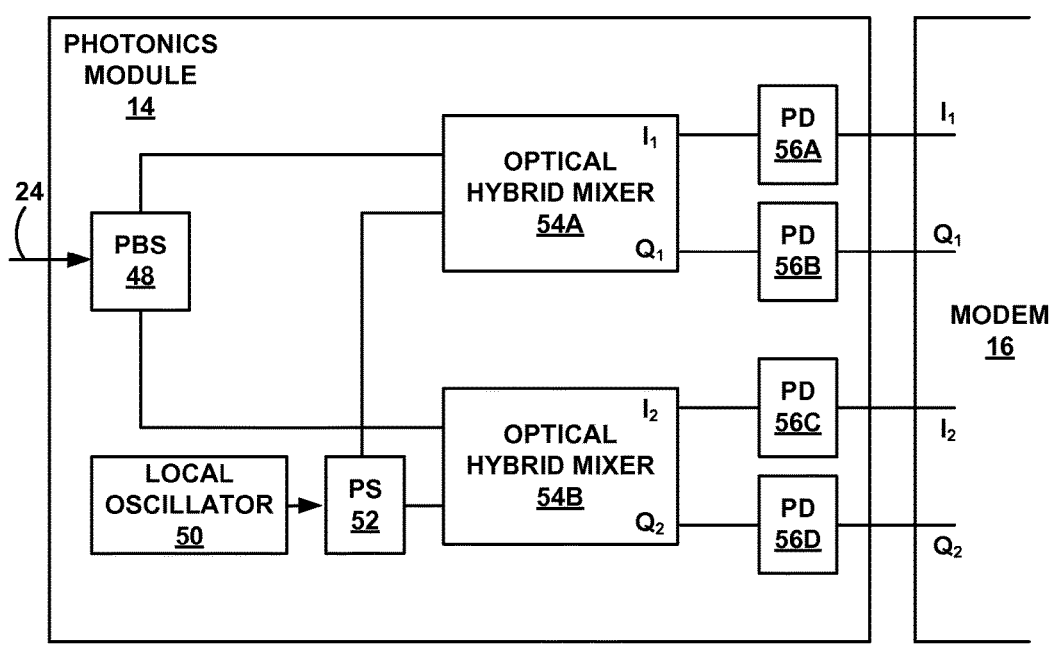
FIGS. 5A and 5B are block diagrams illustrating examples of a photonics module of FIG. 1 in greater detail.
Figure 5B:
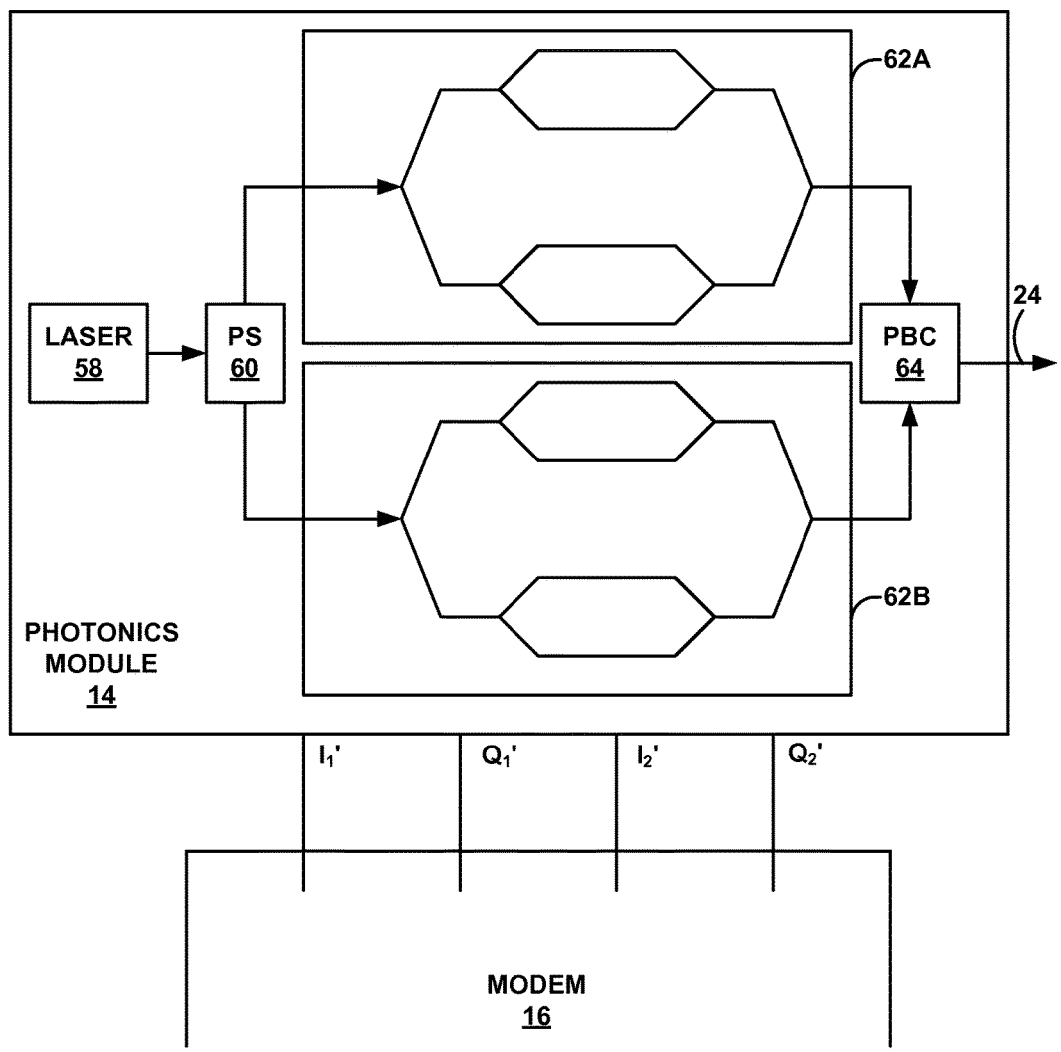

FIGS. 5A and 5B are block diagrams illustrating examples of a photonics module of FIG. 1 in greater detail. FIG. 5A illustrates components of photonics module 14 that receive a PM-QPSK optical signal from network 26, convert the optical signal into I/Q electrical data streams, and transmit the I/Q electrical data streams to modem 16. FIG. 5B illustrates components of photonics module 14 that receive I/Q electrical data streams from modem 16, convert the I/Q electrical data streams into a PM-QPSK modulated optical signal, and transmit the optical signal to network 26. FIGS. 5A and 5B are illustrated separately for ease of description. However, it should be understood that photonics module 14 includes both the receive photonics illustrated in FIG. 5A and the transmit photonics illustrated in FIG. 5B.

Furthermore, the components of photonics module 14 are illustrated for PM-QPSK modulation. Photonics module 14 may include additional, fewer, or different components than those illustrated based on the desired PM-QPSK modulation. In alternate examples, photonics module 14 includes different components for different modulation schemes. For example, if BPSK modulation is desirable, photonics module 14 includes components for coherent BPSK modulation. In general, photonics module 14 includes components needed for the desired type of coherent communication, including even more complex modulation schemes such as multi-level quadrature amplitude modulation (M-QAM where M>4).

As illustrated in FIG. 5A, the receive photonics of photonics module 14 include polarization beam splitter (PBS) 48, local oscillator (LO) 50, polarization splitter (PS) 52, optical hybrid mixers 54A and 54B, and photo-detectors (PDs) 56A-56D. PDs 56A-56D convert the magnitude of the optical signal to an electrical representation. PBS 48 receives an optical signal from network 26 via optical link 24 and splits the received optical signal into first and second optical signals with nominally orthogonal polarization (e.g., substantially orthogonal polarization). Each one of optical hybrid mixers 54A and 54B receive respective optical signals from the first and second nominally orthogonal optical signals from PBS 48.

The receive photonics also include local oscillator 50, which is a laser. Local oscillator 50 provides the phase reference required in coherent system to recover the PM-QPSK optical waveform that photonics module 14 receives. In some examples, local oscillator 50 may be a free running oscillator. For example, the laser signal outputted by local oscillator 50 may not need to be phase-locked with the optical signal that PBS 48 receives.

Polarization splitter (PS) 52 receives the light from local oscillator 50 and splits the light into (at least) first and second light paths. Each one of optical hybrid mixers 54A and 54B receive respective local oscillator light from the first and second light paths from the PS 52. In some examples, the location of PBS 48 and PS 52 may be swapped with no loss of functionality, provided the light from local oscillator 50 is split into two nominally orthogonally polarized lightwaves.

Optical hybrid mixers 54A and 54B each mix the respective optical signals from PBS 48 with the respective local oscillator lightwave reference from PS 52 and output optical data stream representing in-phase (I) and quadrature-phase (Q) components of the PM-QPSK modulated signal. For example, optical hybrid mixer 54A outputs $I_1$ and $Q_1$ optical data streams. Optical hybrid mixer 54B outputs $I_2$ and $Q_2$ optical data streams. In some examples, optical hybrid mixers 54A and 54B may be 90 degree optical hybrid mixers. Also, in some examples, each one of the $I_1$, $Q_2$, $I_2$, and $Q_2$ optical data streams may be differentially encoded data streams.

Photo-detectors 56A-56D receive respective optical signals of the $I_1$, $Q_2$, $I_2$, and $Q_2$ optical data streams and convert these optical signals into analog electrical data streams. Photo-detectors 56A-56D may be composed of a single photo-diode or a pair of nominally balanced photo-diodes. A transimpedence amplifier (TIA) element for each photo-detector may used to convert photo-current from the photo-diode(s) to a voltage representation. However, the inclusion of TIA elements may not be necessary in every example. The electrical output of each photo-detector in 56A-56D can be single-ended or differential electrical signals. In some examples, the TIA elements may include automatic gain control (AGC) amplifiers, or the AGC amplifiers may be external to the TIA elements. The AGC amplifiers may nominally maintain output electrical voltage amplitude/swing for varying input electrical current amplitude/swings.

In this manner, the receive photonics of photonics module 14 convert the PM-QPSK modulated optical signal into electrical I and Q data stream pairs representing the optical PM-QPSK signal for further processing by processor modem 16. For example, modem 16 receives the I/Q electrical data stream pairs from photo-detectors 56A-56D.

As illustrated in FIG. 5B, the transmit photonics of photonics module 14 include laser 58, polarization splitter (PS) 60, modulators 62A and 62B, and polarization beam combiner (PBC) 64. PBC 64 is coupled to optical link 24 and outputs an optical modulated signal (e.g., a PM-QPSK modulated optical signal). Also, as illustrated, photonics module 14 receives $I_1'$, $Q_1'$, $I_2'$, and $Q_2'$ data streams, which are electrical data streams are outputted by modem 16 for PM-QPSK modulation.

In this disclosure, the terms $I_1'$, $Q_1'$, $I_2'$, and $Q_2'$ data streams are used to described data streams that modem 16 transmits to photonics module 14, and the terms $I_1$, $Q_1$, $I_2$, and $Q_2$ data streams are used to described data streams that modem 16 receives from photonics module 14. The $I_1'$, $Q_1'$, $I_2'$, and $Q_2'$ data streams that modem 16 transmits may be different from the $I_1$, $Q_1$, $I_2$, and $Q_2$ data streams that modem 16 receives. For example, the $I_1'$, $Q_1'$, $I_2'$, and $Q_2'$ data streams are for downstream communication, while the $I_1$, $Q_1$, $I_2$, and $Q_2$ data streams are for upstream communication.

For example, the $I_1'$ and $Q_1'$ data streams may form a first pair of data streams that modem 16 transmits, and may be for the lightwave with polarization 1. The $I_2'$ and $Q_2'$ data streams may form a second pair of data streams that modem 16 transmits, and may be for the lightwave with polarization 2. In some examples, the $I_1'$, $Q_1'$, $I_2'$, and $Q_2'$ data streams may be composed of differential data streams that are AC coupled via capacitors to photonics module 14. In some examples, photonics module 14 may include drive amplifiers coupled to each one of the $I_1'$, $Q_1'$, $I_2'$, and $Q_2'$ data streams. The drive amplifiers may amplify the voltage level of the $I_1'$, $Q_1'$, $I_2'$, and $Q_2'$ data streams outputted by modem 16.

Laser 58 may be any type of laser that is usable for high bit rate optical signal transmission, typically a low linewidth laser in the 1550 nm wavelength range (so-called C-Band), but can be any wavelength. Optical amplifiers operating in same wavelength range may allow photonics module 14 to transmit the generated optical signal a relatively far distance. An example is Erbium-Doped Fiber Amplifiers (EDFAs), which amplify light in the 1550 nm spectral region. The ability of photonics module 14 to transmit the generated optical signal a relatively far distance reduces the number of intermittent optical-to-electrical-to-optical (O-E-O) repeaters needed to regenerate the transmitted optical signal.

Polarization splitter (PS) 60 receives the light from laser 34 and splits the light into (at least) two paths, and may be similar to PS 52 of FIG. 5A. Each one of modulators 62A and 62B receives light from one of the paths. Modulators 62A and 62B modulate the light on the respective paths with respective I/Q electrical data stream pairs. Modulators 62A and 62B may be referred to as IQ modulators or Cartesian modulators. In the example of FIG. 5B, modulator 62A receives the $I_1'$ and $Q_1'$ electrical data streams and modulates the light to form a complex modulated lightwave signal, modulated in both magnitude and phase, forming a QPSK signal. Modulator 62B receives $I_2'$ and $Q_2'$ electrical data streams and modulates the light to form a complex modulated lightwave signal, modulated in both magnitude and phase, forming a second QPSK signal.

Polarization beam combiner (PBC) 64 receives the polarized and modulated optical signals from each one of modulator 62A and 62B. For instance, the optical QPSK signals from modulators 62A or 62B are then multiplexed in (nominally orthogonal) polarization using PBC 64. For example, PBC 64 combines the received QPSK optical signals into nominally orthogonal polarizations into a single polarization multiplexed (PM) optical signal and transmits the PM-QPSK optical signal to network 26 via optical link 24. In this manner, photonics module 14 utilizes lightwave communications techniques to generate and transmit an optical PM-QPSK signal.

Figure 6:
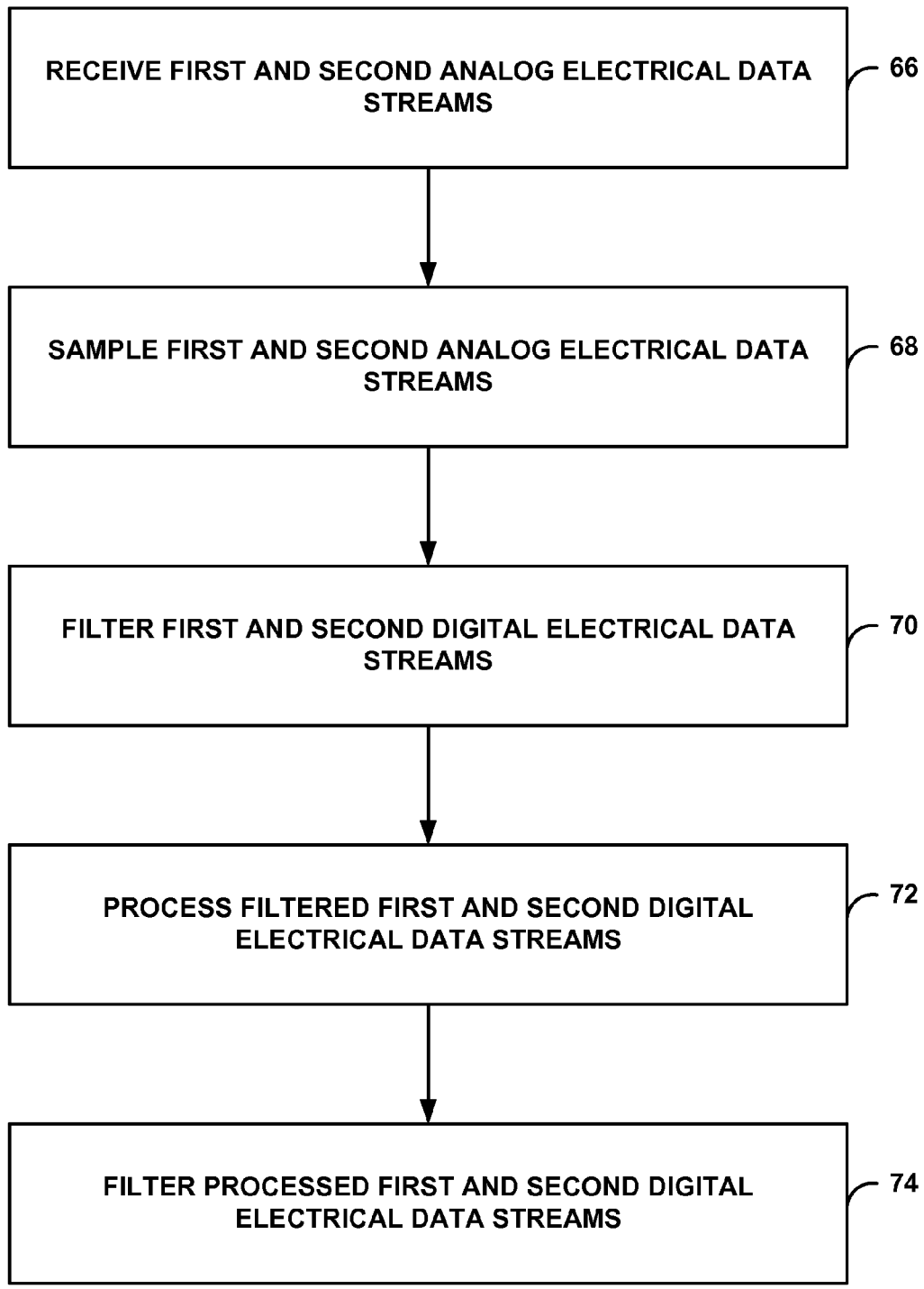
FIG. 6 is a flow chart illustrating an example technique in accordance with one or more aspects of this disclosure.

FIG. 6 is a flow chart illustrating an example technique in accordance with one or more aspects of this disclosure. For purposes of illustration only, reference is made to FIGS. 1-3.

A first ADC receives a first analog electrical data stream, and a second ADC receives a second analog electrical data stream (66). For example, ADC 18A receives a first analog electrical data stream (e.g., $I_1$) from photonics module 14, and ADC 18B receives a second analog electrical data stream (e.g., $Q_1$) from photonics module 14. In this example, the first and second analog electrical data streams together represent a portion of the optical signal received by photonics module 14. For instance, $I_1$ and $Q_1$ together represent a lightwave of the optical signal with polarization 1. Similarly, ADC 18C receives a third analog electrical data stream (e.g., $I_2$) from photonics module 14, and ADC 18D receives a fourth analog electrical data stream (e.g., $Q_2$) from photonics module 14. In this example, the third and fourth analog electrical data streams together represent another portion of the optical signal received by photonics module 14. For instance, $I_2$ and $Q_2$ together represent a lightwave of the optical signal with polarization 2.

The first ADC and the second ADC sample the first and second analog electrical data streams to convert the first and second analog electrical data streams to first and second digital electrical data streams (68). For example, ADC 18A samples the first analog electrical data stream at a sampling rate that is nominally twice or greater than twice the symbol rate at which photonics module 14 transmitted the first and second analog electrical data streams to convert the first analog electrical data stream into a first digital electrical data stream at the sampling rate. Similarly, ADC 18B samples the second analog electrical data stream at the sampling rate that is nominally twice or greater than twice the symbol rate at which photonics module 14 transmitted the first and second analog electrical data streams to convert the second analog electrical data stream into a second digital electrical data stream at the sampling rate. ADCs 18C and 18D perform similar functions with respect to the third and fourth analog electrical data streams.

Furthermore, ADCs 18A-18D may sample their respective analog electrical data streams without the analog electrical data streams being filtered prior to ADCs 18A-18D sampling their respective analog electrical data streams. For instance, photonics module 14 may not be coupled to an analog filter that filters the $I_1$, $Q_1$, $I_2$, and $Q_2$ analog electrical data streams prior to ADCs 18A-18D sampling the $I_1$, $Q_1$, $I_2$, and $Q_2$ analog electrical data streams.

As an example, photonics module 14 receives an optical PM-QPSK signal with a symbol rate of 25 Gbaud. Photonics module 14 converts the optical signal into the $I_1$, $Q_1$, $I_2$, and $Q_2$ analog electrical data streams. The symbol rate of these analog electrical data streams is 25 Gsamples/s. In this example, ADCs 18A-18D sample these analog electrical data streams at a sampling rate that is nominally equal to or greater than 50 Gsamples/s (e.g., nominally twice the symbol rate or greater than twice the symbol rate of these electrical data streams).

A first digital filter and a second digital filter digitally filter the first and second digital electrical data streams (70). For example, digital filter 20A digitally filters the first digital electrical data stream to output a first filtered digital electrical data stream at an effective sampling rate that is less than the sampling rate at which ADC 18A sampled and less than twice the symbol rate of the first and second analog electrical data streams, and greater than or equal to the symbol rate of the first and second analog electrical data streams. Similarly, digital filter 20B digitally filters the second digital electrical data stream to output a second filtered digital electrical data stream at an effective sampling rate that is less than the sampling rate at which ADC 18B sampled and less than twice the symbol rate of the first and second analog electrical data streams, and greater than or equal to the symbol rate of the first and second analog electrical data streams. Digital filters 20C and 20D perform similar functions with respect to the third and fourth analog electrical data streams.

For instance, keeping with the previous example, the sampling rate of the first and second digital data streams, as converted by ADCs 18A and 18B, is at 50 Gsamples/s. In this example, the sampling rate of the first and second digital data streams is 50 Gsamples/s. Digital filters 20A and 20B filter the first and second digital data streams to output filtered digital electrical data streams at an effective sampling rate that is less than the sampling rate and greater than twice the symbol rate, which both equal 50 Gsamples/s in this example, and greater than or equal to 25 Gbaud. As one example, the effective sampling rate may be approximately 5/4*25 (i.e., 31.25 GSamples/s).

In examples described in this disclosures, the number of samples that need to be processed per second in the output of digital filters 20A and 20B is equivalent to the number of samples that need to be processed per second as if ADCs 18A-18D sampled at a sampling rate equal to the effective sampling rate. However, in aspects of this disclosure, because ADCs 18A-18D sample at a sampling rate that is nominally twice or greater than twice the symbol rate, aliasing effects may be minimized the digital data stream that digital filters 20A-20D receive. Also, although digital filters 20A-20D output filtered data streams at the effective sampling rate, which is less than the sampling rate and twice the symbol rate, the low pass filters within digital filters 20A-20D may minimize aliasing effects. Accordingly, the data streams outputted by digital filters 20A-20D may require downstream hardware units 22 to process fewer samples per second as compared to if downstream hardware units 22 received the digital data streams directly from ADCs 18A-18D.

Downstream hardware units 22 that include at least one component configured to process the digitally filtered first and second digital electrical data streams at a rate that is substantially similar to the effective sampling rate (e.g., equal to the effective sampling rate) (72). For example, CD equalizer 28A and timing recover unit 30 process the digitally filtered first and second electrical data streams at a rate that is substantially similar to the effective sampling rate (e.g., equal to the effective sampling rate). For instance, if the effective sampling rate is 31.25 Gsamples/s, then CD equalizer 28A would process 31.25 Gsamples of the digitally filtered first and second electrical data streams per second. Another digital filter is configured to filter the processed digitally filtered first and second digital electrical data streams to output a digital electrical data stream at a further reduced effective sampling rate (74). For example, digital filter 40 outputs filtered data stream at a reduced effective sampling rate of 25 Gsamples/s.

Figure 7:
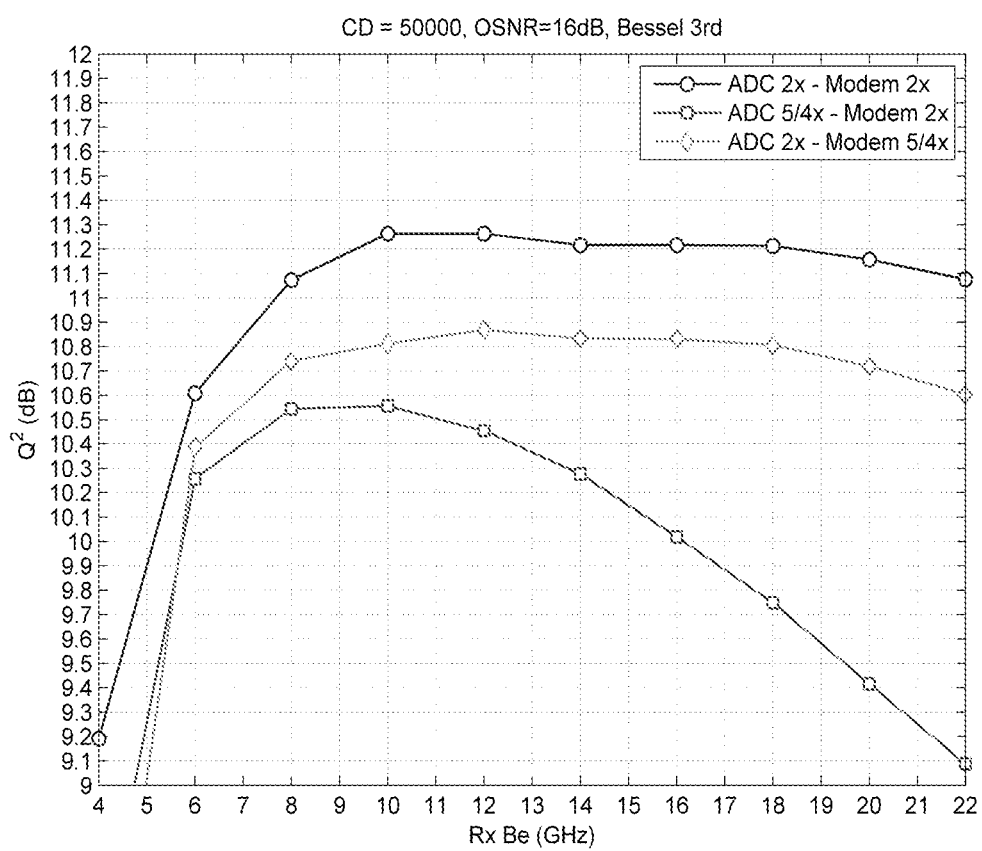
FIG. 7 is a graphical diagram illustrating example results in accordance with one or more aspects of this disclosure.

FIG. 7 is a graphical diagram illustrating example results in accordance with one or more aspects of this disclosure. In FIG. 7, the y-axis represents a measure of system performance expressed in $Q^2$ factor, where the exponent 2 indicates that the Q factor is using a "20 log" definition such as $Q^2$ (dB) equals $20 \log_{10}(Q_{linear})$. The x-axis represents the analog bandwidth of the front-end of the ADC such as ADCs 18A-18D, and is represented as Rx Be in giga-hertz (GHz). The values of FIG. 7 were generated with the symbol rate (R) being 31.625 Gbaud and with PM-QPSK modulation.

The top line in circles represents the system performance where ADCs 18A-18D sample at a sampling rate of at least twice the symbol rate (2*R), and digital filters 20A-20D output digital data streams at the sampling rate, and not the effective sampling rate. In other words, the components of modem 16 operate with the 2*R number of samples per second. The top line may be considered as representing the system performance of an ideal system where the size and power consumption of the components of modem 16 are not of concern.

The bottom line in squares represents the system performance where the output of photonics module 14 is low pass filtered with an analog low pass filter prior to the ADCs receiving the analog electrical data streams from photonics module 14. In this example, the analog low pass filter is simulated with an analog filter shape of a Bessel-Thompson of $3^{rd}$ order. In the bottom line in squares, the ADCs sample at less than the Nyquist rate because the analog low pass filter low pass filters the output of photonics module 14. For purposes of illustration, the bandwidth of the analog low pass filter was selected to be 5/4*R to provide a proper comparison with examples where digital filters 20A-20D achieve an effective sampling rate of 5/4*R.

The middle line in diamonds represents the system performance in accordance with one or more example techniques described in this disclosure. For example, the middle line represents the system performance where ADCs 18A-18D sample the received analog electrical data streams at a sampling rate of 2*R. Then, digital filters 20A-20D filter and output filtered digital data streams at an effective sampling rate of 5/4*R.

As illustrated, when the analog bandwidth Rx Be is reduced below a certain value (in this example <8 GHz), too much signal frequency content may be filtered and distortion is introduced in the waveform that cannot be compensated by modem 16 and a severe penalty is shown. Accordingly, in FIG. 7, the top, middle, and bottom lines all indicate poor performance at frequencies less than approximately 8 GHz.

As illustrated in FIG. 7, for the ideal case, as represented by the top line, for frequencies greater than 8 GHz, the performance is practically constant as a function of Rx Be because the sampling in the ADCs is being done at the Nyquist rate which is not producing aliasing effect. As illustrated in the bottom line, which represents a system where the data streams outputted by photonics module 14 are analog low pass filtered prior to the ADCs, there are aliasing effects because the sampling rate is less than the Nyquist rate. However, the penalty of the aliasing effects, in the bottom line, is based on the Rx Be value. For example, at optimum Rx Be of 10 GHz, the penalty is about 0.7 dB (i.e., the difference at 10 GHz between the top line and bottom line). However, at RX Be of 22 GHz, where only weak filtering is applied, most of the aliasing effects may not be removed, leading to more than 2 dB penalty compared to the top line.

The middle line, which represents example system performance values for techniques described in this disclosure, illustrates system performance behavior similar to that of the ideal case (e.g., fairly constant as a function of Rx Be). However, there is a slight penalty compared to the ideal case because the number of samples that need to be processed per second in the output of digital filters 20A-20D is less than the Nyquist rate, which introduces aliasing effects. For example, FIG. 7 illustrates a slight constant penalty of approximately 0.4 dB (e.g., the difference between the top line and the middle line) across values of Rx Be. This small penalty may be due to residual aliasing effects that the low pass filters of digital filters 20A-20D may not be able to remove. Nevertheless, the potential benefits of reduced size and power consumption of modem 16, which may result in achieving the effective sampling rate in the manner described above, may outweigh the drawbacks associated with a small penalty of 0.4 dB as compared to the ideal situation.

The techniques of this disclosure may be implemented in a wide variety of devices or apparatuses, including linecards, routers, optical interfaces, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units.

Various examples have been described. These and other examples are within the scope of the following claims.

The invention claimed is:

1. A method comprising:
receiving a first analog electrical data stream transmitted by a photonics module in a coherent optical communication system, and a second analog electrical data stream transmitted by the photonics module that together represent a portion of an optical signal received by the photonics module;
sampling the first analog electrical data stream and the second analog electrical data stream at a sampling rate that is approximately twice or greater than twice a symbol rate of the first and second analog electrical data streams to convert the first analog electrical data stream to a first digital electrical data stream, and convert the second analog electrical data stream to a second digital electrical data stream;
digitally filtering the first digital electrical data stream and the second digital electrical data stream to output a first filtered digital electrical data stream and a second filtered electrical data stream, respectively, at a first effective sampling rate that is less than the sampling rate and less than twice the symbol rate of the first and second analog electrical data streams, and greater than or equal to the symbol rate of the first and second analog electrical data streams;
compensating for chromatic dispersion on at least the first and second filtered digital electrical data streams at a rate that is substantially equal to the first effective sampling rate to generate a compensated digital electrical data stream;
upsampling the compensated digital electrical data stream;
performing timing recovery using the upsampled compensated digital electrical data stream to generate a timing recovered digital electrical data stream at a second effective sampling rate;
digitally filtering the timing recovered digital electrical data stream at a third effective sampling rate, different than the first effective sampling rate, that is less than the sampling rate and less than twice the symbol rate of the first and second analog electrical data streams and greater than or equal to the symbol rate of the first and second analog electrical data streams; and
processing the digitally filtered timing recovered digital electrical data stream at a rate that is substantially equal to the third effective sampling rate to recover data in the optical signal received by the photonics module.

2. The method of claim 1, wherein the sampling rate is at least twice the symbol rate, wherein the first effective sampling rate and the third effective sampling rate is less than twice the symbol rate, when the sampling rate is at least twice the symbol rate, and greater than the symbol rate, wherein the rate that is substantially equal to the first effective sampling rate is equal to the first effective sampling rate, and wherein the rate that is substantially equal to the third effective sampling rate is equal to the third effective sampling rate.

3. The method of claim 1, wherein the portion of the received optical signal comprises a first portion, the method further comprising:
receiving a third analog electrical data stream transmitted by the photonics module, and a fourth analog electrical data stream transmitted by the photonics module that together represent a second portion of the optical signal received by the photonics module;
sampling the third analog electrical data stream and the fourth analog electrical data stream at the sampling rate to convert the third analog electrical data stream into a third digital electrical data stream, and the fourth analog electrical data stream into a fourth digital electrical data stream;
digitally filtering the third digital electrical data stream and the fourth digital electrical data stream to output a third filtered digital electrical data stream and a fourth filtered electrical data stream, respectively, at the first effective sampling rate; and
processing the third and fourth filtered digital electrical data streams at the rate that is substantially equal to the first effective sampling rate to recover the data in the optical signal received by the photonics module.

4. The method of claim 3, wherein receiving the first analog electrical data stream transmitted by the photonics module, and the second analog electrical data stream comprises receiving the first analog electrical data stream transmitted by the photonics module, and the second analog electrical data stream that together represent a lightwave of the optical signal with a first polarization, and wherein receiving the third analog electrical data stream transmitted by the photonics module, and the fourth analog electrical data stream comprises receiving the third analog electrical data stream transmitted by the photonics module, and the fourth analog electrical data stream that together represent a lightwave of the optical signal with a second polarization.

5. The method of claim 1, wherein sampling the first analog electrical data stream comprises sampling the first analog electrical data stream without filtering the first analog electrical data stream prior to sampling the first analog electrical data stream, and wherein sampling the second analog electrical data stream comprises sampling the second analog electrical data stream without filtering the second analog electrical data stream prior to sampling the second analog electrical data stream.

6. The method of claim 1, wherein the third effective sampling rate is less than the first effective sampling rate and the second effective sampling rate.

7. The method of claim 1, wherein the first effective sampling rate is 5/4 times the symbol rate, and third effective sampling rate is equal to the symbol rate.

8. A processor comprising:
a first analog-to-digital converter (ADC) configured to receive a first analog electrical data stream transmitted by a photonics module in a coherent optical communication system, and sample the first analog electrical data stream at a sampling rate that is approximately twice or greater than twice a symbol rate of the first analog electrical data stream and a second analog electrical data stream, which together represent a portion of an optical signal received by the photonics module, to convert the first analog electrical data stream into a first digital electrical data stream;
a second ADC configured to receive the second analog electrical data stream transmitted by the photonics module, and sample the second analog electrical data stream at the sampling rate that is approximately twice or greater than twice the symbol rate of the first and second analog electrical data streams to convert the second analog electrical data stream into a second digital electrical data stream;
a first digital filter configured to digitally filter the first digital electrical data stream to output a first filtered digital electrical data stream at a first effective sampling rate that is less than the sampling rate and less than twice the symbol rate of the first and second analog electrical data streams, and greater than or equal to the symbol rate of the first and second analog electrical data streams;
a second digital filter configured to digitally filter the second digital electrical data stream to output a second filtered digital electrical data stream at the first effective sampling rate that is less than the sampling rate and less than twice the symbol rate of the first and second analog electrical data streams, and greater than or equal to the symbol rate of the first and second analog electrical data streams;
a chromatic dispersion equalizer configured to compensate for chromatic dispersion on at least the first and second filtered digital electrical data streams at a rate that is substantially equal to the first effective sampling rate to generate a compensated digital electrical data stream;
a timing recovery unit configured to upsample the compensated digital electrical data stream and perform timing recovery using the upsampled compensated digital electrical data stream to generate a timing recovered digital electrical data stream at a second effective sampling rate;
a third digital filter configured to digitally filter the timing recovered digital electrical data stream at a third effective sampling rate, different than the first effective sampling rate, that is less than the sampling rate and less than twice the symbol rate of the first and second analog electrical data streams, and greater than or equal to the symbol rate of the first and second analog electrical data streams; and a downstream hardware unit that includes at least one component configured to process the digitally filtered timing recovered digital electrical data stream at a rate that is substantially equal to the third effective sampling rate to recover data in the optical signal received by the photonics module.

9. The processor of claim 8, wherein the sampling rate is at least twice the symbol rate, wherein the first effective sampling rate and the third effective sampling rate is less than twice the symbol rate, when the sampling rate is at least twice the symbol rate, and greater than the symbol rate, wherein the rate that is substantially equal to the first effective sampling rate is equal to the first effective sampling rate, and wherein the rate that is substantially equal to the third effective sampling rate is equal to the third effective sampling rate.

10. The processor claim 8, wherein the processor is a modulator-demodulator (modem).

11. The processor of claim 8, wherein the processor comprises a digital signal processor.

12. The processor of claim 8, wherein the portion of the received optical signal comprises a first portion, the processor further comprising:
a third ADC configured to receive a third analog electrical data stream transmitted by the photonics module, and sample the third analog electrical data stream at the sampling rate to convert the third analog electrical data stream into a third digital electrical data stream;
a fourth ADC configured to receive a fourth analog electrical data stream transmitted by the photonics module that together with the third analog electrical data stream represents a second portion of the optical signal received by the photonics module, and sample the fourth analog electrical data stream at the sampling rate to convert the fourth analog electrical data stream into a fourth digital electrical data stream;
a fourth digital filter configured to digitally filter the third digital electrical data stream to output a third filtered digital electrical data stream at the first effective sampling rate; and
a fifth digital filter configured to digitally filter the fourth digital electrical data stream to output a fourth filtered digital electrical data stream at the first effective sampling rate.

13. The processor of claim 12, wherein the first and second analog electrical data streams together represent a lightwave of the optical signal with a first polarization, and wherein the third and the fourth analog electrical data streams together represent a lightwave of the optical signal with a second polarization.

14. The processor of claim 8, wherein the first ADC is configured to sample the first analog electrical signal without the first analog electrical signal being filtered prior to the first ADC sampling the first analog electrical signal, and wherein the second ADC is configured to sample the second analog electrical signal without the second analog electrical signal being filtered prior to the second ADC sampling the second analog electrical signal.

15. The processor of claim 8, wherein the third effective sampling rate is less than the first effective sampling rate and the second effective sampling rate.

16. The processor of claim 8, wherein the first effective sampling rate is 5/4 times the symbol rate, and third effective sampling rate is equal to the symbol rate.

17. A network device comprising:
a photonics module configured to receive an optical signal in a coherent optical communication system and transmit a first analog electrical data stream and a second analog data stream that together represent a portion of the optical signal; and a processor comprising:
- a first analog-to-digital converter (ADC) configured to receive the first analog electrical data stream, and sample the first analog electrical data stream at a sampling rate that is approximately twice or greater than twice a symbol rate of the first and second analog electrical data streams to convert the first analog electrical data stream into a first digital electrical data stream;
- a second ADC configured to receive the second analog electrical data stream, and sample the second analog electrical data stream at the sampling rate that is approximately twice or greater than twice the symbol rate of the first and second analog electrical data streams to convert the second analog electrical data stream into a second digital electrical data stream;
- a first digital filter configured to digitally filter the first digital electrical data stream to output a first filtered digital electrical data stream at a first effective sampling rate that is less than the sampling rate and less than twice the symbol rate of the first and second analog electrical data streams, and greater than or equal to the symbol rate of the first and second analog electrical data streams;
- a second digital filter configured to digitally filter the second digital electrical data stream to output a second filtered digital electrical data stream at the first effective sampling rate that is less than the sampling rate and less than twice the symbol rate of the first and second analog electrical data streams, and greater than or equal to the symbol rate of the first and second analog electrical data streams;
- a chromatic dispersion equalizer configured to compensate for chromatic dispersion on at least the first and second filtered digital electrical data streams at a rate that is substantially equal to the first effective sampling rate to generate a compensated digital electrical data stream;
- a timing recovery unit configured to upsample the compensated digital electrical data stream and perform timing recovery using the upsampled compensated digital electrical data stream to generate a timing recovered digital electrical data stream at a second effective sampling rate;
- a third digital filter configured to digitally filter the timing recovered digital electrical data stream at a third effective sampling rate, different than the first effective sampling rate, that is less than the sampling rate and less than twice the symbol rate of the first and second analog electrical data streams, and greater than or equal to the symbol rate of the first and second analog electrical data streams; and
- a downstream hardware unit that includes at least one component configured to process the digitally filtered timing recovered digital electrical data stream at a rate that is substantially equal to the third effective sampling rate to recover data in the optical signal received by the photonics module.

18. The network device of claim 17, wherein the photonics module receives a polarization multiplexed quadrature phase shift keying (PM-QPSK) modulated optical signal, and wherein the first and second analog electrical data streams represent a lightwave of the PM-QPSK modulated optical signal with a first polarization.

19. The network device of claim 17, wherein the first ADC is configured to sample the first analog electrical signal without the first analog electrical signal being filtered prior to the first ADC sampling the first analog electrical signal, and wherein the second ADC is configured to sample the second analog electrical signal without the second analog electrical signal being filtered prior to the second ADC sampling the second analog electrical signal.

* * * * *